United States Patent
Jain et al.

(10) Patent No.: US 9,110,945 B2
(45) Date of Patent: *Aug. 18, 2015

(54) SUPPORT FOR A PARAMETERIZED QUERY/VIEW IN COMPLEX EVENT PROCESSING

(71) Applicant: Oracle International Corporation, Redwood Shores, CA (US)

(72) Inventors: Parul Jain, Sunnyvale, CA (US); Vikram Shukla, Fremont, CA (US); Anand Srinivasan, Bangalore (IN); Alexandre de Castro Alves, Santa Clara, CA (US); Eric Hsiao, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,230

(22) Filed: Nov. 12, 2013

(65) Prior Publication Data

US 2014/0136514 A1 May 15, 2014

Related U.S. Application Data

(63) Continuation of application No. 13/193,377, filed on Jul. 28, 2011, now Pat. No. 8,713,049.

(60) Provisional application No. 61/384,182, filed on Sep. 17, 2010.

(51) Int. Cl.
*G06F 17/30* (2006.01)

(52) U.S. Cl.
CPC .... *G06F 17/30433* (2013.01); *G06F 17/30427* (2013.01); *G06F 17/30448* (2013.01)

(58) Field of Classification Search
CPC ............. G06F 17/30427; G06F 17/30433; G06F 17/30448
USPC ................ 707/758, 769, 779, E17.014
See application file for complete search history.

(56) References Cited

U.S. PATENT DOCUMENTS

| | | | |
|---|---|---|---|
| 4,996,687 | A | 2/1991 | Hess et al. |
| 5,051,947 | A | 9/1991 | Messenger et al. |

(Continued)

FOREIGN PATENT DOCUMENTS

| | | |
|---|---|---|
| EP | 1241589 | 9/2002 |
| EP | 2474922 | 7/2012 |

(Continued)

OTHER PUBLICATIONS

"Pattern Recognition With Match_Recognize," Oracle™ Complex Event Processing CQL Language Reference, 11g Release 1 (11.1.1) E12048-01, May 2009, pp. 15-1 to 15-20.

(Continued)

*Primary Examiner* — Shiow-Jy Fan
(74) *Attorney, Agent, or Firm* — Kilpatrick Townsend & Stockton LLP

(57) ABSTRACT

The present invention includes a method for providing parameterized queries in complex event processing (CEP). The method includes providing a query template which includes one or more bind variables, providing sets of parameters corresponding to the one or more bind variables, and parsing the query template to determine positions of the one or more bind variables. The method further includes scanning the provided sets of parameters to determine which of the sets of parameters are to be bound to the one or more bind variables, binding the one or more bind variables which are determined to be bound to the sets of parameters, and substituting the bound one or more bind variables with the corresponding sets of parameters. The method further includes injecting all incarnations of the parameterized queries into the system, and one template/parameterized query is configured to run them all.

19 Claims, 14 Drawing Sheets

(56) References Cited

U.S. PATENT DOCUMENTS

| | | |
|---|---|---|
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,219,660 B1 * | 4/2001 | Haderle et al. ............. 707/718 |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 * | 1/2006 | Kaluskar et al. ............. 1/1 |
| 6,996,557 B1 | 2/2006 | Leung et al. |
| 7,020,696 B1 | 3/2006 | Perry et al. |
| 7,047,249 B1 * | 5/2006 | Vincent ............. 1/1 |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | De Castro Alves et al. |
| 8,134,184 B2 | 3/2012 | Becker et al. |
| 8,145,859 B2 | 3/2012 | Park et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,447,744 B2 | 5/2013 | Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |

(56) References Cited

U.S. PATENT DOCUMENTS

| | | |
|---|---|---|
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |
| 8,762,369 B2 | 6/2014 | Macho et al. |
| 8,775,412 B2 | 7/2014 | Day et al. |
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167704 A1 | 7/2006 | Nicholls et al. |
| 2006/0167856 A1* | 7/2006 | Angele et al. ............... 707/3 |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156964 A1 | 7/2007 | Sistla |
| 2007/0192301 A1 | 8/2007 | Posner |
| 2007/0198479 A1 | 8/2007 | Cai et al. |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |

(56) References Cited

U.S. PATENT DOCUMENTS

| | | |
|---|---|---|
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0327102 A1 | 12/2009 | Maniar et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106946 A1 | 4/2010 | Imaki et al. |
| 2010/0125574 A1 | 5/2010 | Navas |
| 2010/0125584 A1 | 5/2010 | Navas |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0293135 A1 | 11/2010 | Candea et al. |
| 2010/0312756 A1 | 12/2010 | Zhang et al. |
| 2010/0318652 A1 | 12/2010 | Samba |
| 2011/0004621 A1* | 1/2011 | Kelley et al. ............. 707/769 |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1 | 5/2011 | Zhang et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0178775 A1 | 7/2011 | Schoning et al. |
| 2011/0196839 A1 | 8/2011 | Smith et al. |
| 2011/0196891 A1 | 8/2011 | De Castro et al. |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0041934 A1 | 2/2012 | Srinivasan et al. |
| 2012/0072455 A1 | 3/2012 | Jain et al. |
| 2012/0130963 A1 | 5/2012 | Luo et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0332240 A1 | 12/2013 | Patri et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0156683 A1 | 6/2014 | de Castro Alves |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0358959 A1 | 12/2014 | Bishnoi et al. |
| 2014/0379712 A1 | 12/2014 | Lafuente Alvarez |

FOREIGN PATENT DOCUMENTS

| | | |
|---|---|---|
| WO | 0049533 | 8/2000 |
| WO | 0118712 | 3/2001 |
| WO | 0159602 | 8/2001 |
| WO | 0165418 | 9/2001 |
| WO | 03030031 | 4/2003 |
| WO | 2007122347 | 11/2007 |
| WO | 2012037511 | 3/2012 |
| WO | 2012050582 | 4/2012 |
| WO | 2012154408 | 11/2012 |
| WO | 2012158360 | 11/2012 |

OTHER PUBLICATIONS

"Supply Chain Event Management: Real-Time Supply Chain Event Management," product information Manhattan Associates (copyright 2009-2012) one page.

Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.

Chandramouli et al. "High-Performance Dynamic Pattern Matching over Disordered Streams," Proceedings of the VLDB Endowment, vol. 3 Issue 1-2, pp. 220-231 (Sep. 2010).

Chapple "Combining Query Results with the UNION Command," ask.com Computing Databases, downloaded from: http://databases.about.com/od/sql/a/union.htm (no date, printed on Oct. 14, 2013).

Complex Event Processing in the Real World, An Oracle White Paper, Sep. 2007, 13 pages.

Coral8 Complex Event Processing Technology Overview, Coral8, Inc., Make it Continuous, Copyright 2007 Coral8, Inc., 2007, pp. 1-8.

Creating WebLogic Domains Using the Configuration Wizard, BEA Products, Version 10.0, Dec. 2007, 78 pages.

(56) References Cited

OTHER PUBLICATIONS

Creating Weblogic Event Server Applications, BEA WebLogic Event Server, Version. 2.0, Jul. 2007, 90 pages.
Dependency Injection, Dec. 30, 2008, pp. 1-7.
Deploying Applications to WebLogic Server, Mar. 30, 2007, 164 pages.
Developing Applications with Weblogic Server, Mar. 30, 2007, 254 pages.
EPL Reference, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Esper Reference Documentation, Copyright 2007, Ver. 1.12.0, 2007, 158 pages.
Esper Reference Documentation, Copyright 2008, ver. 2.0.0, 2008, 202 pages.
Fantozzi "A Strategic Approach to Supply Chain Event Management," student submission for Masters Degree, Massachusetts Institute of Technology (Jun. 2003) 36 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs100/quickstart/quick_start.html, May 10, 2010, 1 page.
Getting Started with WebLogic Event Server, BEA WebLogic Event Server version 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Komazec et al. "Towards Efficient Schema-Enhanced Pattern Matching over RDF Data Streams," Proceedings of the 1st International Workshop on Ordering and Reasoning (OrdRing 2011), Bonn, Germany, (Oct. 2011).
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(printer).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Ogrodnek "Custom UDFs and hive," Bizo development blog http://dev.bizo.com (Jun. 23, 3009) 2 pages.
Oracle Application Server 10g, Release 2 and 3, New Features Overview, An Oracle White Paper, Oracle., Oct. 2005, 48 pages.
Oracle Application Server, Administrator's Guide, 10g Release 3 (10.1.3.2.0), B32196-01, Oracle, Jan. 2007, 376 pages.
Oracle Application Server, Enterprise Deployment Guide, 10g Release 3 (10.1.3.2.0), B32125-02, Oracle, Apr. 2007, 120 pages.
Oracle CEP Getting Started, Release 11 gR1 (11.1.1) E14476-01, May 2009, 172 pages.
Oracle Complex Event Processing CQL Language Reference, 1g Release 1 (11.1.1) E12048-01, Apr. 2010, 540 pages.
Oracle Database Data Cartridge Developer's Guide, B28425-03, 11 g Release 1 (11.1), Oracle, Mar. 2008, 372 pages.
Oracle Database, SQL Language Reference 11 g Release 1 (11.1), B28286-02, Oracle, Sep. 2007, 1496 pages.
Oracle Database, SQL Reference, 10g Release 1 (10.1), Part No. B10759-01, Dec. 2003, 7-1 to 7-17; 7-287 to 7-290; 14-61 to 14-74.
Oracle™ Complex Event Processing CQL Language Reference, 11g Release 1 (11.1.1.4.0) E12048-04,(Jan. 2011), pp. title page, iii-xxxviii, 1-1 to 4-26, 6-1 to 6-12, 18-1 to 20-26, Index-1 to Index-14.

Oracle™ Complex Event Processing CQL Language Reference, 11g Release 1 (11.1.1) E12048-03, (Apr. 2010) pp. 18-1 to 18.9.5.
Oracle™ Fusion Middleware CQL Language Reference, 11g Release 1 (11.1.1.6.3) E12048-10, (Aug. 2012) pp. title page, iii-xxxvi, 1-1 to 4-26, 6-1 to 6-12, 18-1 to 20-26, Index-1 to Index-14.
OSGI Service Platform Core Specification, The OSGI Alliance, OSGI Alliance, Apr. 2007, 288 pages.
Pradhan "Implementing and Configuring SAP® Event Management" Galileo Press, pp. 17-21 (copyright 2010).
Release Notes, BEA WebLogic Event Server, Ver. 2.0, Jul. 2007, 8 pages.
Spring Dynamic Modules for OSGi Service Platforms product documentation, Jan. 2008, 71 pages.
SQL Tutorial-In, Tizag.com, http://web.archive.org/web/20090216215219/http://www.tizag.com/sqiTutorial/sqlin.php,, Feb. 16, 2009, pp. 1-3.
Stream Base New and Noteworthy, Stream Base, Jan. 12, 2010, 878 pages.
Stream Query Repository: Online Auctions, at URL: http://www-db.stanford.edu/stream/sqr/onauc.html#queryspecsend, Dec. 2, 2002, 2 pages.
Stream: The Stanford Stream Data Manager, Retrieved from: URL: http://infolab.stanford.edu/stream/, Jan. 5, 2006, pp. 1-9.
The Stanford Stream Data Manager, IEEE Data Engineering Bulletin, Mar. 2003, pp. 1-8.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebSphere Application Server V6.1 Problem Determination: IBM Redpaper Collection, Dec. 2007, 634 pages.
What is BPM? Datasheet [online]. IBM, [retrieved on Jan. 28, 2013]. Retrieved from the Internet: <URL: http://www-01.ibm.com/software/info/bpm/whatis-bpm/>.
Wilson "SAP Event Management, an Overview," Q Data USA, Inc.( copyright 2009) 16 pages.
U.S. Appl. No. 10/948,523, Final Office Action mailed on Jul. 6, 2007, 37 pages.
U.S. Appl. No. 10/948,523, Non-Final Office Action mailed on Dec. 11, 2007, 48 pages.
U.S. Appl. No. 10/948,523, Notice of Allowance mailed on Dec. 1, 2008, 17 pages.
U.S. Appl. No. 10/948,523, Notice of Allowance mailed on Jul. 8, 2008, 28 pages.
U.S. Appl. No. 10/948,523, Office Action mailed on Jan. 22, 2007, 32 pages.
U.S. Appl. No. 10/948,523, Supplemental Notice of Allowance mailed on Jul. 17, 2008, 4 pages.
U.S. Appl. No. 10/948,523, Supplemental Notice of Allowance mailed on Aug. 25, 2008, 3 pages.
Non-Final Office Action for U.S. Appl. No. 11/601,415 dated Dec. 11, 2013, 57 pages.
U.S. Appl. No. 11/601,415, Final Office Action mailed on May 27, 2009, 26 pages.
U.S. Appl. No. 11/601,415, Final Office Action mailed on Jul. 2, 2012, 58 pages.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Office Action mailed on Dec. 9, 2011, 44 pages.
U.S. Appl. No. 11/873,407, Final Office Action mailed on Apr. 26, 2010, 11 pages.
U.S. Appl. No. 11/873,407, Non-Final Office Action mailed on Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.

(56) References Cited

OTHER PUBLICATIONS

U.S. Appl. No. 11/874,197, Final Office Action mailed on Aug. 12, 2011, 21 pages.
U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.
U.S. Appl. No. 11/874,197, Office Action mailed on Nov. 10, 2009, 14 pages.
U.S. Appl. No. 11/874,202, Final Office Action mailed on Jun. 8, 2010, 18 pages.
U.S. Appl. No. 11/874,202, Non-Final Office Action mailed on Dec. 3, 2009, 15 pages.
U.S. Appl. No. 11/874,202, Notice of Allowance mailed on Mar. 31, 2011, 9 pages.
U.S. Appl. No. 11/874,202, Notice of Allowance mailed on Dec. 22, 2010, 13 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 12 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 15 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 5 pages.
U.S. Appl. No. 11/927,681, Non-Final Office Action mailed on Mar. 24, 2011, 14 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 10 pages.
U.S. Appl. No. 11/927,683, Notice of Allowance mailed on Nov. 9, 2011, 7 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Jul. 10, 2013, 10 pages.
U.S. Appl. No. 11/977,437, Notice of Allowance mailed on Mar. 4, 2013, 9 pages.
U.S. Appl. No. 11/977,437, Office Action mailed on Aug. 3, 2012, 16 pages.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, Notice of Allowance mailed on Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/395,871, Non-Final Office Action mailed on May 27, 2011, 7 pages.
U.S. Appl. No. 12/395,871, Notice of Allowance mailed on May 4, 2012, 5 pages.
U.S. Appl. No. 12/395,871, Office Action mailed on Oct. 19, 2011, 8 pages.
U.S. Appl. No. 12/396,008, Non-Final Office Action mailed on Jun. 8, 2011, 9 pages.
U.S. Appl. No. 12/396,008, Notice of Allowance mailed on Nov. 16, 2011, 5 pages.
Non-Final Office Action for U.S. Appl. No. 12/396,464 dated Dec. 31, 2013, 15 pages.
U.S. Appl. No. 12/396,464, Final Office Action mailed on Jan. 16, 2013, 16 pages.
U.S. Appl. No. 12/396,464, Non-Final Office Action mailed on Sep. 7, 2012, 17 pages.
U.S. Appl. No. 12/506,891, Notice of Allowance mailed on Jul. 25, 2012, 8 pages.
U.S. Appl. No. 12/506,891, Office Action mailed on Dec. 14, 2011, 17 pages.
U.S. Appl. No. 12/506,905, Notice of Allowance mailed on Dec. 14, 2012, 8 pages.
U.S. Appl. No. 12/506,905, Office Action mailed on Aug. 9, 2012, 33 pages.
U.S. Appl. No. 12/506,905, Office Action mailed on Mar. 26, 2012, 60 pages.
U.S. Appl. No. 12/534,384, Notice of Allowance mailed on May 7, 2013, 11 pages.
U.S. Appl. No. 12/534,384, Office Action mailed on Feb. 28, 2012, 12 pages.
U.S. Appl. No. 12/534,384, Office Action mailed on Feb. 12, 2013, 13 pages.
U.S. Appl. No. 12/534,398, Final Office Action mailed on Jun. 5, 2012, 16 pages.
U.S. Appl. No. 12/534,398, Notice of Allowance mailed on Nov. 27, 2012, 9 pages.
U.S. Appl. No. 12/534,398, Office Action mailed on Nov. 1, 2011, 14 pages.
U.S. Appl. No. 12/548,187, Final Office Action mailed on Jun. 10, 2013, 17 pages.
U.S. Appl. No. 12/548,187, Non Final Office Action mailed on Sep. 27, 2011, 17 pages.
U.S. Appl. No. 12/548,187, Non-Final Office Action mailed on Apr. 9, 2013, 17 pages.
U.S. Appl. No. 12/548,187, Office Action mailed on Jun. 20, 2012, 31 pages.
U.S. Appl. No. 12/548,209, Notice of Allowance mailed on Oct. 24, 2012, 12 pages.
U.S. Appl. No. 12/548,209, Office Action mailed on Apr. 16, 2012, 16 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 17 pages.
U.S. Appl. No. 12/548,222, Notice of Allowance mailed on Jul. 18, 2013, 12 pages.
U.S. Appl. No. 12/548,222, Office Action mailed on Jun. 20, 2012, 20 pages.
U.S. Appl. No. 12/548,281, Final Office Action mailed on Oct. 10, 2013, 21 pages.
U.S. Appl. No. 12/548,281, Non-Final Office Action mailed on Apr. 12, 2013, 16 pages.
U.S. Appl. No. 12/548,281, Non-Final Office Action mailed on Oct. 3, 2011, 18 pages.
U.S. Appl. No. 12/548,281, Office Action mailed on Jun. 20, 2012, 29 pages.
U.S. Appl. No. 12/548,290, Final Office Action mailed on Jul. 30, 2012, 21 pages.
U.S. Appl. No. 12/548,290, Non-Final Office Action mailed on Oct. 3, 2011, 15 pages.
U.S. Appl. No. 12/548,290, Non-Final Office Action mailed on Apr. 15, 2013, 17 pages.
U.S. Appl. No. 12/548,290, Notice of Allowance mailed on Sep. 11, 2013, 6 pages.
U.S. Appl. No. 11/874,197, Notice of Allowance mailed on Jun. 22, 2012, 20 pages.
U.S. Appl. No. 12/913,636, Final Office Action mailed on Jan. 8, 2013, 21 pages.
U.S. Appl. No. 12/913,636, Office Action mailed on Jun. 7, 2012.

(56) References Cited

OTHER PUBLICATIONS

U.S. Appl. No. 12/949,081, Final Office Action mailed on Aug. 27, 2013, 12 pages.
U.S. Appl. No. 12/949,081, Non-Final Office Action mailed on Jan. 9, 2013, 12 pages.
U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, Final Office Action mailed on Apr. 25, 2013, 10 pages.
U.S. Appl. No. 12/957,201, Office Action mailed on Dec. 19, 2012, 13 pages.
Non-Final Office Action for U.S. Appl. No. 13/089,556 dated Jan. 9, 2014, 13 pages.
U.S. Appl. No. 13/089,556, Final Office Action mailed on Aug. 29, 2013, 10 pages.
U.S. Appl. No. 13/089,556, Non-Final Office Action mailed on Apr. 10, 2013, 9 pages.
U.S. Appl. No. 13/089,556, Office Action mailed on Nov. 6, 2012, 12 pages.
U.S. Appl. No. 13/102,665, Final Office Action mailed on Jul. 9, 2013, 16 pages.
U.S. Appl. No. 13/102,665, Office Action mailed on Feb. 1, 2013, 13 pages.
U.S. Appl. No. 13/107,742, Final Office Action mailed on Jul. 3, 2013, 19 pages.
U.S. Appl. No. 13/107,742, Non-Final Office Action mailed on Feb. 14, 2013, 16 pages.
U.S. Appl. No. 13/177,748, Non-Final Office Action mailed on Aug. 30, 2013, 23 pages.
U.S. Appl. No. 13/184,528, Notice of Allowance mailed on Mar. 1, 2012, 16 pages.
U.S. Appl. No. 13/193,377, Notice of Allowance mailed on Aug. 30, 2013, 18 pages.
U.S. Appl. No. 13/193,377, Office Action mailed on Jan. 17, 2013, 24 pages.
U.S. Appl. No. 13/193,377, Office Action mailed on Aug. 23, 2012, 20 pages.
U.S. Appl. No. 13/244,272, Notice of Allowance mailed on Aug. 12, 2013, 12 pages.
U.S. Appl. No. 13/244,272, Final Office Action mailed on Mar. 28, 2013, 29 pages.
U.S. Appl. No. 13/244,272, Office Action mailed on Oct. 4, 2012, 29 pages.
Non-Final Office Action for U.S. Appl. No. 12/548,187 dated Feb. 6, 2014, 53 pages.
Non-Final Office Action for U.S. Appl. No. 12/548,281 dated Feb. 13, 2014, 19 pages.
Agrawal et al. "Efficient pattern matching over event streams," Proceedings of the 2008 ACM SIGMOD international conference on Management of data, pp. 147-160 (Jun. 2008).
Abadi et al., Yes Aurora: A Data Stream Management System, International Conference on Management of Data, Proceedings of the 2003 ACM SIGMOD International Conference on Management of Data, 2003, 4 pages.
Aho et al., Efficient String Matching: An Aid to Bibliographic Search, Communications of the ACM, vol. 18, No. 6, Association for Computing Machinery, Inc., Jun. 1975, pp. 333-340.
Arasu et al., An Abstract Semantics and Concrete Language for Continuous Queries over Streams and Relations, 9th International Workshop on Database programming languages, Sep. 2003, 12 pages.
Arasu et al., CQL: A language for Continuous Queries over Streams and Relations, Lecture Notes in Computer Science vol. 2921, 2004, pp. 1-19.
Arasu et al., STREAM: The Stanford Data Stream Management System, Department of Computer Science, Stanford University, 2004, p. 21.
Arasu et al., The CQL Continuous Query Language: Semantic Foundations and Query Execution, Stanford University, The VLDB Journal—The International Journal on Very Large Data Bases, vol. 15, No. 2, Springer-Verlag New York, Inc, Jun. 2006, pp. 1-32.
Avnur et al., Eddies: Continuously Adaptive Query Processing, In Proceedings of the 2000 ACM SIGMOD International Conference on Data, Dallas TX, May 2000, 12 pages.
Avnur et al. , Eddies: Continuously Adaptive Query Processing, 2007, 4 pages.
Babcock et al., Models and Issues in Data Streams, Proceedings of the 21st ACM SIGMOD-SIGACT-SIDART symposium on Principles database systems, 2002, 30 pages.
Babu et al., Continuous Queries over Data Streams, SIGMOD Record, vol. 30, No. 3, Sep. 2001, pp. 109-120.
Bai et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose et al., A Query Algebra for Fragmented XML Stream Data, 9th International Conference on Data Base Programming Languages (DBPL), Sep. 2003, 11 pages.
Buza , Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan et al., Efficient Filtering of XML documents with Xpath expressions, 2002, pp. 354-379.
Chandrasekaran et al., TelegraphCQ: Continuous Dataflow Processing for an UncertainWorld, Proceedings of CIDR, 2003, 12 pages.
Chen et al., NiagaraCQ: A Scalable Continuous Query System for Internet Databases, Proceedings of the 2000 SIGMOD International Conference on Management of Data, May 2000, pp. 379-390.
Colyer et al. , Spring Dynamic Modules Reference Guide, Copyright, ver. 1.0.3, 2006-2008, 73 pages.
Colyer et al. , Spring Dynamic Modules Reference Guide, Ver. 1.1.3, 2006-2008, 96 pages.
Conway, An Introduction to Data Stream Query Processing, Truviso, Inc., May 24, 2007, 71 pages.
Demers et al., Towards Expressive Publish/Subscribe Systems, Proceedings of the 10th International Conference on Extending Database Technology (EDBT 2006), Munich, Germany, Mar. 2006, pp. 1-18.
Demichiel et al., JSR 220: Enterprise JavaBeans™, EJB 3.0 Simplified API, EJB 3.0 Expert Group, Sun Microsystems, Ver. 3.0, May 2, 2006, 59 pages.
Deshpande et al., Adaptive Query Processing, Slide show believed to be prior to Oct. 17, 2007, 27 pages.
Diao et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Florescu et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.

(56) References Cited

OTHER PUBLICATIONS

Gosling et al., The Java Language Specification, 1996-2005, 684 pages.
Hao et al., Achieving high performance web applications by service and database replications at edge servers, Performance Computing and communications conference(IPCCC) IEEE 28th International, IEEE, Piscataway, NJ, USA, 2009, pp. 153-160.
Hopcroft, Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining., Aug. 2001, 10 pages.
Jin et al., ARGUS: Efficient Scalable Continuous Query Optimization for Large-Volume Data Streams, 10th International Database Engineering and Applications Symposium (IDEAS'06), 2006, 7 pages.
Kawaguchi et al., Java Architecture for XML Binding (JAXB) 2.2, Sun Microsystems, Inc., Dec. 10, 1999, 384 pages.
Knuth et al., Fast Pattern Matching in Strings, Siam J Comput. vol. 6(2), Jun. 1977, pp. 323-350.
Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP?, Complex Event Processing, downloaded, at URL:http://complexevents.com/?p=103, Apr. 29, 2011, 5 pages.
Madden et al., Continuously Adaptive Continuous Queries (CACQ) over Streams, SIGMOD 2002, Jun. 4-6, 2002, 12 pages.
Martin et al., Finding Application Errors and Security Flaws Using PQL, a Program Query Language, OOPSLA'05, Oct. 16, 2005, pp. 1-19.
Motwani et al., Query Processing Resource Management, and Approximation in a Data Stream Management System, Jan. 2003, 12 pages.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion mailed on Nov. 17, 2011, 55 pages.
International Application No. PCT/US2012/034970, International Search Report and Written Opinion mailed on Jul. 16, 2012, 13 pages.
International Application No. PCT/US2012/036353, International Search Report and Written Opinion mailed on Sep. 12, 2012, 11 pages.
Peng et al., Xpath Queries on Streaming Data, 2003, pp. 1-12.
Peterson, Petri Net Theory and the Modeling of Systems, Prentice Hall, 1981, 301 pages.
PostgresSQL, Documentation: Manuals: PostgresSQL 8.2: User-Defined Aggregates believed to be prior to Apr. 21, 2007, 4 pages.
Sadri et al., Expressing and Optimizing Sequence Queries in Database Systems, ACM Transactions on Database Systems, vol. 29, No. 2, ACM Press, Copyright 2004, Jun. 2004, pp. 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle.com., Oct. 9, 2003, 9 pages.
Sharaf et al., Efficient Scheduling of Heterogeneous Continuous Queries, VLDB '06, Sep. 12-15, 2006, pp. 511-522.
Stolze et al., User-defined Aggregate Functions in DB2 Universal Database, Retrieved from: <http://www.128.ibm.com/deve10perworks/db2/library/tachartic1e/0309stolze/0309stolze.html>, Sep. 11, 2003, 11 pages.
Stump et al., Proceedings, The 2006 Federated Logic Conference, IJCAR '06 Workshop, PLPV '06: Programming Languages meets Program Verification., 2006, pp. 1-113.
Terry et al., Continuous queries over append-only database, Proceedings of ACM SIGMOD, 1992, pp. 321-330.
Ullman et al., Introduction to JDBC, Stanford University, 2005, 7 pages.
Vajjhala et al., The Java Architecture for XML Binding (JAXB) 2.0, Apr. 19, 2006, 384 pages.
Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang et al., Distributed continuous range query processing on moving objects, DEXA'06 Proceedings of the 17th international conference on Database and Expert Systems Applications, 2006, pp. 655-665.
White et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom et al., CQL: A Language for Continuous Queries over Streams and Relations, Oct. 17, 2007, 62 pages.
Widom et al., The Stanford Data Stream Management System, PowerPoint Presentation, Oct. 17, 2007, 110 pages.
Wu et al., Dynamic Data Management for Location Based Services in Mobile Environments, Database Engineering and Applications Symposium, 2003, Jul. 16, 2003, pp. 172-181.
Zemke, XML Query, Mar. 14, 2004, 29 pages.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 12/396,464, Final Office Action mailed on May 16, 2014, 16 pages.
U.S. Appl. No. 13/838,259, filed Mar. 15, 2013, Bishnoi et al., Unpublished.
U.S. Appl. No. 13/839,288, filed Mar. 15, 2013, Bishnoi et al., Unpublished.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.

(56) References Cited

OTHER PUBLICATIONS

Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/913,636, Non-Final Office Action mailed on Jul. 24, 2014, 22 pages.
U.S. Appl. No. 12/957,201, Non-Final Office Action mailed on Jul. 30, 2014, 12 pages.
U.S. Appl. No. 13/764,560, Non-Final Office Action mailed on Sep. 12, 2014, 23 pages.
U.S. Appl. No. 13/770,969, Non-Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on very large data bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report and Written Opinion mailed on Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
U.S. Appl. No. 13/177,748, Final Office Action mailed on Mar. 20, 2014, 23 pages.
PCT Patent Application No. PCT/US2014/010832, International Search Report mailed on Apr. 3, 2014, 9 pages.
Cadonna et al., Efficient event pattern matching with match windows, Proceedings of the 18$^{th}$ ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/828,640, Non-Final Office Action mailed on Dec. 2, 2014, 11 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqlDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Cranor et al. "Gigascope: a stream database for network applications," Proceedings of the 2003 ACM SIGMOD international conference on Management of data, pp. 647-651 (Jun. 2003).
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
Non-Final Office Action for U.S. Appl. No. 12/913,636 dated Apr. 1, 2015, 22 pages.

(56) References Cited

OTHER PUBLICATIONS

Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.

* cited by examiner

Query 405

```
SELECT
        eventName,
        path,
        statName
FROM
        S [range 60 minutes slide 60 minutes]
WHERE
        eventName = 'E1' AND
        path = 'P1' AND
        statName = 'countValue' AND
        stat < 1000
GROUP BY
        eventName,
        path,
        statName
HAVING
        Count(*) >= 3
```

Figure 4A

Template 425

This query computes the {Tracking.$1:project:moving average price:avg(price)} over the last {Tracking.$2:generic::2} ticks for stocks with trading volume greater than {bigTransaction.$1:generic::1000} shares and meets the following condition {Tracking.$3:condition::symbol = 'oracle'}

—1 view→

Parameterized Views 430 select symbol, volume, price from stockChannel where volume > :1

—1 query→

Parameterized Queries 435 select symbol as symbol, :1 as movingAvgPrice from bigTransaction [partition by symbol rows :2 ] group by symbol having :3

Figure 4C

Parameterized View and Query 440

```
<view id="V1">
    SELECT
        symbol, volume, price
    FROM
        StockChannel
    WHERE
        volume > :1
</view>

<query id="Q1">
    SELECT
        symbol, :1
    FROM
        V1 [partition by symbol
            rows :2]
    GROUP BY symbol
</query>
```

Template 445

This query computes the {Q1.$1:project:moving average price:avg(price)} of stocks with trade volumes greater than {V1.$1:generic::10,000} shares over the last {Q1.$2:generic::20} ticks.

Business Query 450

This query computes the moving average price of stocks with trade volumes greater than 10,000 shares over the last 20 ticks.

Figure 4D

SUPPORT FOR A PARAMETERIZED QUERY/VIEW IN COMPLEX EVENT PROCESSING

CROSS-REFERENCES

This application is a continuation application of U.S. Nonprovisional patent application Ser. No. 13/193,377, filed Jul. 28, 2011, entitled "SUPPORT FOR A PARAMETERIZED QUERY/VIEW IN COMPLEX EVENT PROCESSING", which claims priority from U.S. Provisional Patent Application No. 61/384,182, filed Sep. 17, 2010, entitled "SUPPORT FOR PARAMETERIZED QUERY/VIEW IN COMPLEX EVENT PROCESSING", which are hereby incorporated by reference, as if set forth in full in this document, for all purposes.

BACKGROUND

Embodiments of the present invention relate to data processing systems and more particularly to systems and applications pertaining to streaming data with temporal semantics.

Generally, Complex Event Processing (CEP) is an approach that aggregates information from distributed message-based systems, databases, and applications in real-time and dynamically applies rules to discern patterns and trends that would otherwise go unnoticed. This gives companies the ability to identify and even anticipate exceptions and opportunities represented by seemingly unrelated events across highly complex, distributed, and heterogeneous IT environments. CEP may be used to correlate, aggregate, enrich, and detect patterns in high speed streaming data in near real time.

Furthermore, Continuous Query Language (CQL) statements are used to process event streams comprising events. An event stream can be considered a sequence of <tuple, timestamp> pairs, with the tuple referring to the data portion. A stream can have multiple tuples and timestamps can define an order over the tuples in an event stream. Oracle™ Complex Event Processing (OCEP) is used to process such event streams.

Further, a CEP application can have multiple queries and views, which are then executed by a processor. Any real-world application may consist of hundreds of queries and views that only differ in a certain value like range parameter. Maintaining hundreds of queries and views in such a scenario can become a nightmare because a small change in base query or view will lead to affecting hundreds of dependent queries and views.

Use of a form of parameterization or wildcard placeholders provision helps application developers in writing similar queries and views, which differ only by a small criterion. In one embodiment, users are allowed to put wildcard placeholders, which can then be bound with values at runtime. Parameterized Query or view can be viewed as a template, which can then be used for different values. This provides users with the ability to write a single CQL statement that internally can generate multiple CQL statements for different values provided in the bindings.

For Example:
SELECT symbol, AVG(price) AS average, NASDAQ AS market
FROM StockTick t RETAIN ALL EVENTS
WHERE symbol=ORCL
SELECT symbol, AVG(price) AS average, NYSE AS market
FROM StockTick t RETAIN ALL EVENTS
WHERE symbol=JPM
SELECT symbol, AVG(price) AS average, NYSE AS market
FROM StockTick t RETAIN ALL EVENTS
WHERE symbol=WFC It should be noted that the above queries differ either in constant value in project list or constant value in WHERE condition. If there are hundreds of such queries, then any business user might have to write hundreds of such queries and views. Hence, for these and other reasons, improvements in the art are needed.

BRIEF SUMMARY

Embodiments of the present invention include using CEP string substitution to replace the bind variables with the sets of parameters provided for the bind variables, without doing any kind of type checking, etc. This is different from regular databases, in that bind variables also have to pass through type checking, etc. As a result, bind variables in the CEP context offer a more flexible and as a result a more powerful solution, which allows the user to insert arbitrary predicates. Accordingly, bind variables in the CEP environment may be typeless.

The present invention includes a method of providing parameterized queries in complex event processing (CEP). The method includes providing a query template which includes one or more bind variables, providing sets of parameters corresponding to the one or more bind variables, and parsing the query template to determine positions of the one or more bind variables. The method further includes scanning the provided sets of parameters to determine which of the sets of parameters are to be bound to the one or more bind variables, binding the one or more bind variables which are determined to be bound to the sets of parameters, and substituting the bound one or more bind variables with the corresponding sets of parameters.

The method further includes building a map of the determined positions of the one or more bind variables. The substituting of the one or more bind variables with the corresponding sets of parameters includes using the map of determined positions of the one or more bind variables to place the bound sets of parameters within the query template. The providing of the sets of parameters corresponding to the one or more bind variables is performed either statically or dynamically.

In a further embodiment, the providing of the sets of parameters corresponding to the one or more bind variables is performed statically by using a config file at deployment time of the query template, and the providing of the sets of parameters corresponding to the one or more bind variables is performed dynamically by using a module management solution. The config file includes one or more of the following: application association, processor association, query rules, the query template, the sets of parameters, or the bindings.

The method further includes instantiating a new query based on the query template which includes the sets of parameters substituted for the one or more bind variables, instantiating the new query, and injecting the new query into a CEP server. Further, the method includes based on the new query, building a query execution plan, adding the query execution plan to a runtime environment as a continuous query, and executing the continuous query.

The method further includes determining that multiple sets of parameters correspond to the same bind variable, and instantiating a separate new query for each of the multiple sets of parameters which correspond to the same bind variable.

In another embodiment a system for providing parameterized queries in complex event processing (CEP), is described. The system includes a memory and a processor coupled with the memory. The memory has sets of instructions stored thereon which, when executed by the processor, cause the processor to determine a placeholder occurring in a parameterized query for processing an event stream, determine a parameter for the placeholder, generate a query from the parameterized query by substituting the placeholder with the parameter, generate the query; and process the event stream.

The system further includes a CEP server which includes a CQL engine. The CQL engine instantiates CEP applications. The system also includes a visualizer in communication with the CEP server. The visualizer is configured to display result information from the processed event stream.

In a further embodiment. a computer-readable medium is described. The computer-readable medium includes instructions for providing a query template which includes one or more bind variables, providing sets of parameters corresponding to the one or more bind variables, and parsing the query template to determine positions of the one or more bind variables. The computer-readable medium further includes instructions for scanning the provided sets of parameters to determine which of the sets of parameters are to be bound to the one or more bind variables, binding the one or more bind variables which are determined to be bound to the sets of parameters, and substituting the bound one or more bind variables with the corresponding sets of parameters.

The computer-readable medium further includes instructions for determining that new sets of parameters are specified for binding, identifying queries which have been instantiated using sets of parameters prior to being specified with new sets of parameters, deleting the queries which have been instantiated using sets of parameters prior to being specified with new sets of parameters, and instantiating queries using the new sets of parameters for the runtime system.

The computer-readable medium further includes instructions for converting the sets of parameters into strings, checking the strings of the sets of parameters to determine a form of the sets of parameters, comparing the determined type of the sets of parameters with the type of the corresponding bind variables, and in response to the determined type of the sets of parameters matching the type of the corresponding bind variables, verifying the sets of parameters. The type of the corresponding bind variables and sets of parameters may include one or more of the following: INT, FLOAT, LONG, BIG-DECIMAL, DOUBLE, and STRING.

BRIEF DESCRIPTION OF THE DRAWINGS

FIGS. 4A-4D are block diagrams of parameterized queries in CEP, according to embodiments of the present invention.

DETAILED DESCRIPTION

Figure 1:
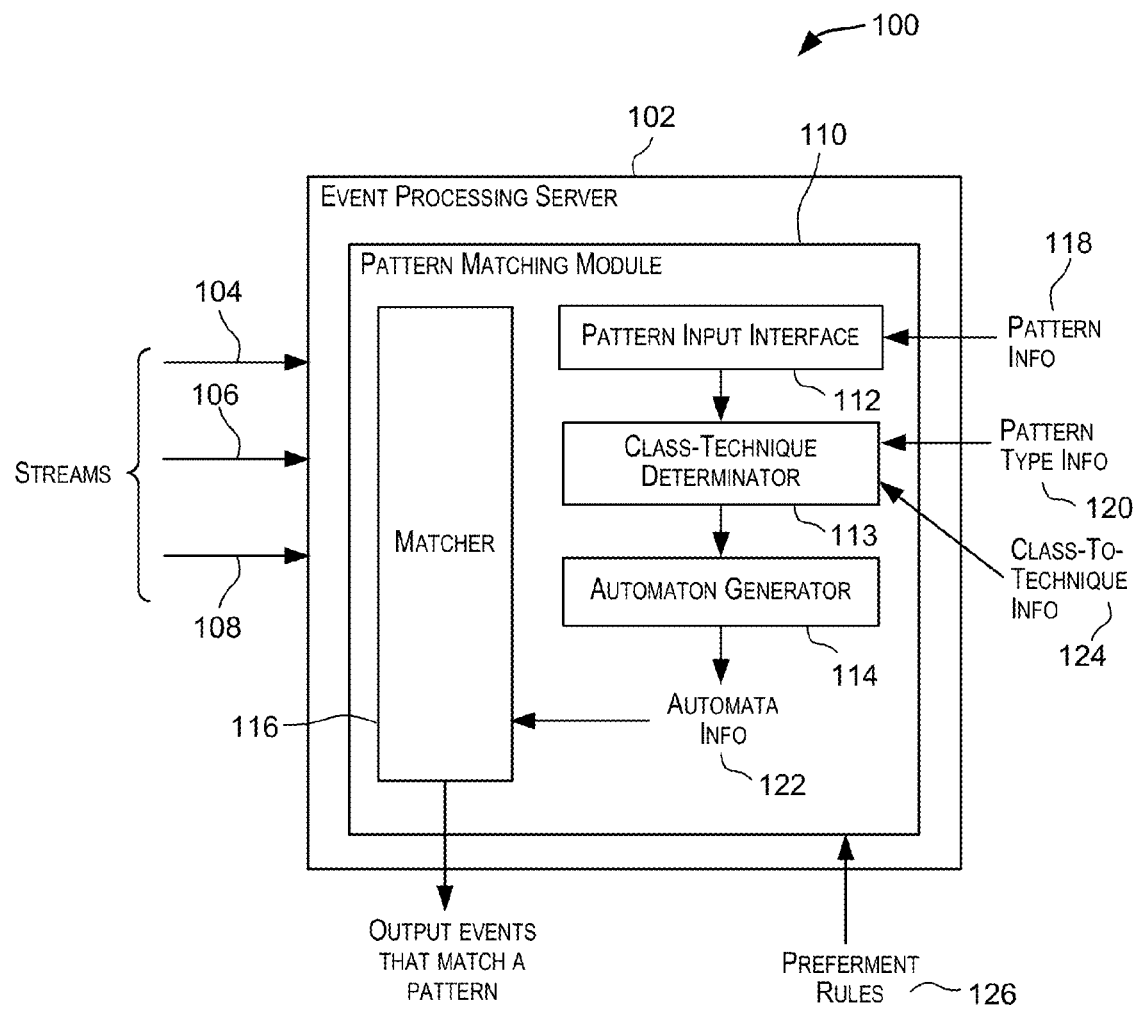
FIG. 1 is block diagram of an event processing server, according to an embodiment of the present invention.

In the following description, for the purposes of explanation, numerous details are set forth in order to provide an understanding of various embodiments of the present invention. It will be apparent, however, to one skilled in the art that certain embodiments can be practiced without some of these details.

Aspects of the present invention include a parameterization approach that provides users with an easy way to write queries and/or views in CEP, which differ in some specific values. For example, the above-mentioned queries can have a single parameterized query that can act as a template and then later can provide the possible values for those bindings, which internally may generate multiple queries and views.

In the following query:

SELECT symbol, AVG (price) AS average, :1 AS market

FROM StockTick [RANGE 5 SECONDS]

WHERE symbol=:2

The :1 and :2 act as placeholders. Different values can be bound to these placeholders either at deployment time or at runtime. Furthermore, a config file associated with a processor component that is configured to process such a query may look like the following:

```
<n1:config xmlns:n1="http://www.bea.com/ns/wlevs/config/application"
    xmlns:xsi="http://www.w3.org/2001/XMLSchema-instance">
    <processor>
        <name>myProcessor</name>
        <rules>
            <rule id="MarketQuery"><![CDATA[
                SELECT symbol, AVG(price) AS average, :1 AS market
                FROM StockTick [RANGE 5 SECONDS]
                WHERE symbol = :2
            ]]></rule>
        </rules>
        <bindings>
            <binding id="MarketQuery">
                <params id="nasORCLQuery">NASDAQ, ORCL</params>
                <params id="nyJPMQuery">NYSE, JPM</params>
                <params id="nyWFCQuery">NYSE, WFC</params>
            </binding>
        </bindings>
    </processor>
</n1:config>
```

In the above example, the MarketQuery CQL query includes two placeholders: one in the SELECT clause and another in the WHERE clause. In this embodiment, the values for these placeholders are also included in the config file itself (or they may also be provided during runtime). The <binding id="MarketQuery"> element specifies the list of parameter sets that will be passed to MarketQuery at runtime. Each parameter set is specified with a single <params> element. Because there are two placeholders in the parameterized query, each <params> element specifies two values separated by a comma.

At runtime, after the placeholders are substituted with the corresponding parameter values, the preceding parameter ized query effectively breaks down into the following three queries:

SELECT symbol, AVG(price) AS average, NASDAQ AS market
FROM StockTick t RETAIN ALL EVENTS
WHERE symbol=ORCL←Query name will be MaketQuery_nasORCLQuery
SELECT symbol, AVG(price) AS average, NYSE AS market
FROM StockTick t RETAIN ALL EVENTS
WHERE symbol=JPM←Query name will be MarketQuery_nyJPMQuery
SELECT symbol, AVG(price) AS average, NYSE AS market
FROM StockTick t RETAIN ALL EVENTS
WHERE symbol=WFC←Query name will be MarketQuery_nyWFCQuery Further aspects of the present invention include using Java™ MBean API's to manipulate sets of parameters. In one embodiment, the parameterized queries and views can be added either at deployment or runtime from the clients. Further, Java™ Management Extensions (JMX) architecture-based MBean APIs may be provided to access or modify the bindings corresponding to the parameterized query or view. A client can call the MBean APIs in order to do the same. In one embodiment, the following MBean APIs may be provided to support such bindings:

Processor ConfigMBean APIs:
bindParameters (String preparedStatementId, String paramsId, String paramsValue)→adds the parameter or binding for query or view (preparedStatementId is id of the query or view), paramsId is the identifier of the param or binding, paramsValue is the comma separated values of the bindings.
replaceBoundParameters (String preparedStatementId, String paramsId, String newParamsValue)→replaces an existing Parameter for a query or view where preparedStatementId is the id of the query or view, paramsId is the param name and newParamsValue is the new comma separated value.
replaceAllBoundParameters (String preparedStatementId, String[ ] paramsIds, String[ ] newParamValues)→replaces multiple parameters for a query or view. The size of array paramsIds and newParamValues should be same i.e., they should have a one on one mapping.
unbindParameters (String preparedStatementId, String paramsId)→deletes or unbinds a specific param or binding of a query or a view.
unbindAllParameters (String preparedStatementId)→deletes or unbinds all the bindings for a rule.
String getBoundParameters (String preparedStatementId, String paramId)→Gets the parameter value for a particular query or view and the parameter name.
String[ ] getAllBoundParameters (String preparedStatementId)→Gets all the parameters or bindings values for a query or a view.
int getNumberOfBoundParameters (String preparedStatementId)→Gets the total count of the parameters bound to a query or view.
Processor RuntimeMBeans APIs:
Map<String, String> getAllParamRules( )→Returns the Map of all the parameterized queries and views existing in a processor. Key is the query or view id and the value is the corresponding statement.

Accordingly, embodiments of the present invention allow for users to write a single parameterized query or view template that can then be bound to different bindings either at deployment or runtime. The user can provide new bindings, which will internally generate a new query and then run it. This template version of queries and views provides an effective way to add and/or remove queries which differ only by some constants. Furthermore, such parameterization or template style of queries and view provides a very user-friendly way to dynamically modify/add/delete hundreds of queries. It provides a user-friendly way for writing CQL queries, and offers ease of use in creating many rules that are similar and provide easy management for such rules.

Further aspects of the present invention provide techniques for determining a placeholder occurring in a parameterized query for processing an event stream. A parameter for the placeholder may then be determined. This may be provided at deployment (e.g., specified in the config file as shown above) or provided during runtime. A query may then be generated from the parameterized query by substituting the placeholder with the parameter. If there are multiple sets of parameters for the placeholder, then multiple queries may be generated from the single parameterized query. A query generated from the substitution may then be provided to the CQL engine that is configured to generate executable instructions for the query. The executable instructions may then be executed to process the event stream.

Turning now to FIG. 1, a simplified block diagram of a system 100 that may incorporate an embodiment of the present invention is shown. As depicted in FIG. 1, system 100 comprises an event processing server 102 that is configured to process one or more incoming data or event streams 104, 106, and 108. Streams 104, 106, and 108 may be received from different sources including a database, a file, a messaging service, various applications, devices such as various types of sensors (e.g., RFID sensors, temperature sensors, etc.), tickers, and the like. Server 102 may receive the streams via a push-based mechanism or a pull-based mechanism or other mechanisms.

A data or event stream is a real-time sequence of events. Multiple events may be received in a stream. The data stream can thus be considered as a stream of unbounded sets of data. In one embodiment, a data stream is a sequence of <tuple, timestamp> pairs. The tuple refers to the data portion of a stream. A tuple may be considered as similar to a row in a table. The tuples in a stream have a schema. A stream can include multiple tuples. Timestamps define an order over the tuples in a data stream. The timestamps in a data stream may reflect an application's notion of time. For example, the timestamp may be set by an application on the system receiving an event stream. The receiving system may timestamp an event on receipt as configured by the application, for example, if specified in the CREATE STREAM DDL that is used to define a structure of the events stream and the mechanism used to use application time or system time as the timestamp. In other embodiments, the timestamp associated with a tuple may correspond to the time of the application sending the data events. The timestamp is part of the schema of a stream. There could be one or multiple tuples with the same timestamp in a stream. The tuples in a stream can be viewed as a series of events and accordingly the data stream is also referred to as an event stream. An event stream can thus be considered to comprise a series of events, each with an associated timestamp. For example, an event stream may comprise a series of temperature readings from a sensor such as 10°, 15°, 20°, etc. and associated time stamps. For purposes of this application, the terms "tuple" and "event" are being used interchangeably.

System 100 comprises an event processing server 102 that is configured to process event streams. Event processing server 102 may receive one or more event streams. As shown in FIG. 1, event processing server 102 receives streams 104, 106, and 108. Each event stream comprises one or more events. The events in a stream are received by server 102 in a sequence at specific time points. Server 102 is configured to perform various types of processing on the incoming streams. According to an embodiment of the present invention, server 102 is configured to detect patterns in the incoming event streams based upon the events in the event streams received by server 102. In one embodiment, server 102 performs the pattern matching without doing any backtracking processing on the events of the stream being analyzed as the events are received by server 102. Pattern matching may be performed using a type of continuous query that is applied to the incoming streams. Server 102 may also perform other types of processing on the input streams such as running other continuous queries on the incoming event streams, and other operations. An example of an event processing server is the Oracle Complex Event Processor from Oracle™ Corporation. Alternatively, MATCH_RECOGNIZE may also be used to perform pattern matching In the embodiment depicted in FIG. 1, server 102 comprises a pattern matching module 110 that is configured to perform processing related to pattern matching for one or more event streams. As depicted in FIG. 1, pattern matching module 110 comprises a pattern input interface 112, a class-technique determinator 113, an automaton generator 114, and a matcher 116. Pattern input interface 112 provides an interface for receiving information specifying patterns to be matched in the event streams. Pattern input interface 112 may provide a graphical user interface that allows information to be entered specifying one or more patterns to be matched, a command line interface for specifying the patterns to be matched, or some other interface. A pattern to be matched may be specified by a user of server 102. Information identifying a pattern to be matched may also be received from other sources, for example, from other components or modules of event processing server 102, or other systems or applications.

In one embodiment, patterns to be matched are specified using regular expressions. A regular expression is a string of symbols (also referred to as correlation names or correlation variables) representing the pattern to be matched. The regular expression is built using one or more symbols and may use one or more operators. Examples of operators include but are not limited to a concatenation operator (e.g., an "AND" operator between symbols in a regular expression may be used to indicate an AND relationship between the symbols), alternation operator (e.g., a vertical bar '|' may separate symbols in a regular expression indicating an OR condition for the symbols), one or more quantifiers, grouping operator (e.g., indicated by parentheses), and the like. Examples of quantifiers include an asterisk '*' implying zero or more occurrences of the symbol with which the quantifier is associated, a plus sign '+' implying one or more occurrences of the symbol with which the quantifier is associated, a question mark '?' implying zero or one occurrences of the symbol with which the quantifier is associated, reluctant quantifiers, and the like. Examples of operators and quantifiers that may be used, including associated syntax for the regular expressions, are provided and described in Fred Zemke et al., "Pattern Matching in Sequence of Rows (12)," ISO/IEC JTCi/SC32 WG3:URC-nnn, ANSI NCITS H2-2006-nnn, Jul. 31, 2007, the entire contents of which are herein incorporated by reference for all purposes.

In the past, regular expressions have been mainly used to find patterns in strings. In embodiments of the present invention, the power of regular expressions is used to match patterns in event streams received by event processing server 102. Regular expressions provide a simple, concise, and flexible way for specifying patterns to be matched. In the embodiment depicted in FIG. 1, event processing server 102 may receive pattern information 118 specifying a regular expression to be matched in one or more event streams. In one embodiment, the pattern may be specified using pattern input interface 112 of pattern matching module 110.

Pattern information 118 may be provided using different languages. In one embodiment, a programming language such as SQL, which is commonly used to query databases, may be used. Extensions may be provided to SQL to express the pattern to be matched for event streams. For example, pattern information 118 may specify a SQL query comprising a regular expression specifying a pattern to be matched in one or more event streams received by event processing server 102.

Oracle supports a CQL (Continuous Query Language) language in Complex Events Processing (CEP) products. CQL is very similar to SQL with extensions for stream processing. Pattern matching constructs proposed to extend SQL to specify pattern matching via regular expressions (e.g., the constructs described in Fred Zemke et al., "Pattern Matching in Sequence of Rows (12)," ISO/IEC JTCi/SC32 WG3:URC-nnn, ANSI NCITS H2-2006-nnn, Jul. 31, 2007, the entire contents of which are herein incorporated by reference for all purposes) have been adopted in CQL to extend CQL for the purpose of specifying pattern matching requirements over event streams.

Typically, pattern matching for a query pattern occurs only over a single input stream. Pattern matching may also be performed over multiple event streams, for example, using CQL. In one embodiment, this may be done by first performing a UNION of all the relevant input streams over which pattern matching is to be done with the result defining a view corresponding to an intermediate stream, and the pattern to be matched can be specified over this single intermediate stream. The pattern will then be matched to all the streams included in the view.

Figure 2A:
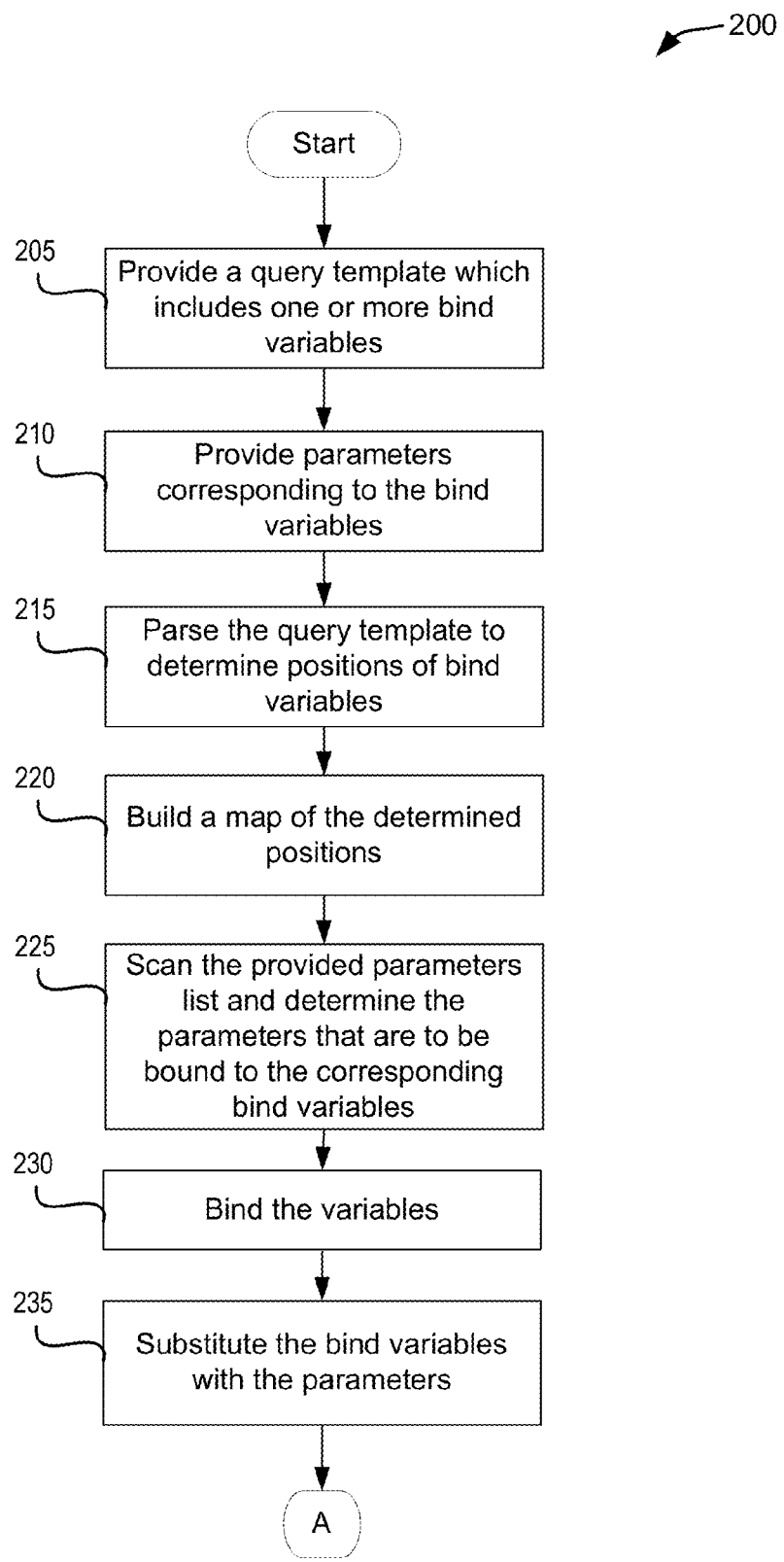
FIGS. 2A-2C are flow diagrams for implementing parameterized queries in CEP, according to embodiments of the present invention.

Referring next to FIG. 2A, a method 200 of implementing parameterized queries in CEP is illustrated, according to embodiments of the present invention. At process block 205, a query template with one or more bind variables is provided. The sets of parameters corresponding to the bind variables (i.e., to which the bind variables are to be bound) are provided (process block 210). In one embodiment, the sets of parameters may be provided either statically (e.g., via a config file, done typically at time of deployment) or dynamically at runtime (e.g., using JMX or some other mechanism). Accordingly, dynamic provisioning using JMX are used during runtime, and can be used for deleting sets of parameters, providing new sets of parameters, etc.

At process block 215, the query template is parsed to determine positions of bind variables. In one embodiment, the bind variables may be identified, for example, by :1, :2, :3, etc. The ordering of the bind variables within the query does not have to be in the order of the 1, 2, 3, etc. Accordingly, a map of the determined positions of the bind variables may be built (process block 220).

At process block 225, the provided sets of parameters list may be scanned to determine the sets of parameters that are to be bound to the corresponding bind variables, and then the binding may occur (process block 230). At process block 235, the bind variables may be substituted with the sets of parameters.

Figure 2B:
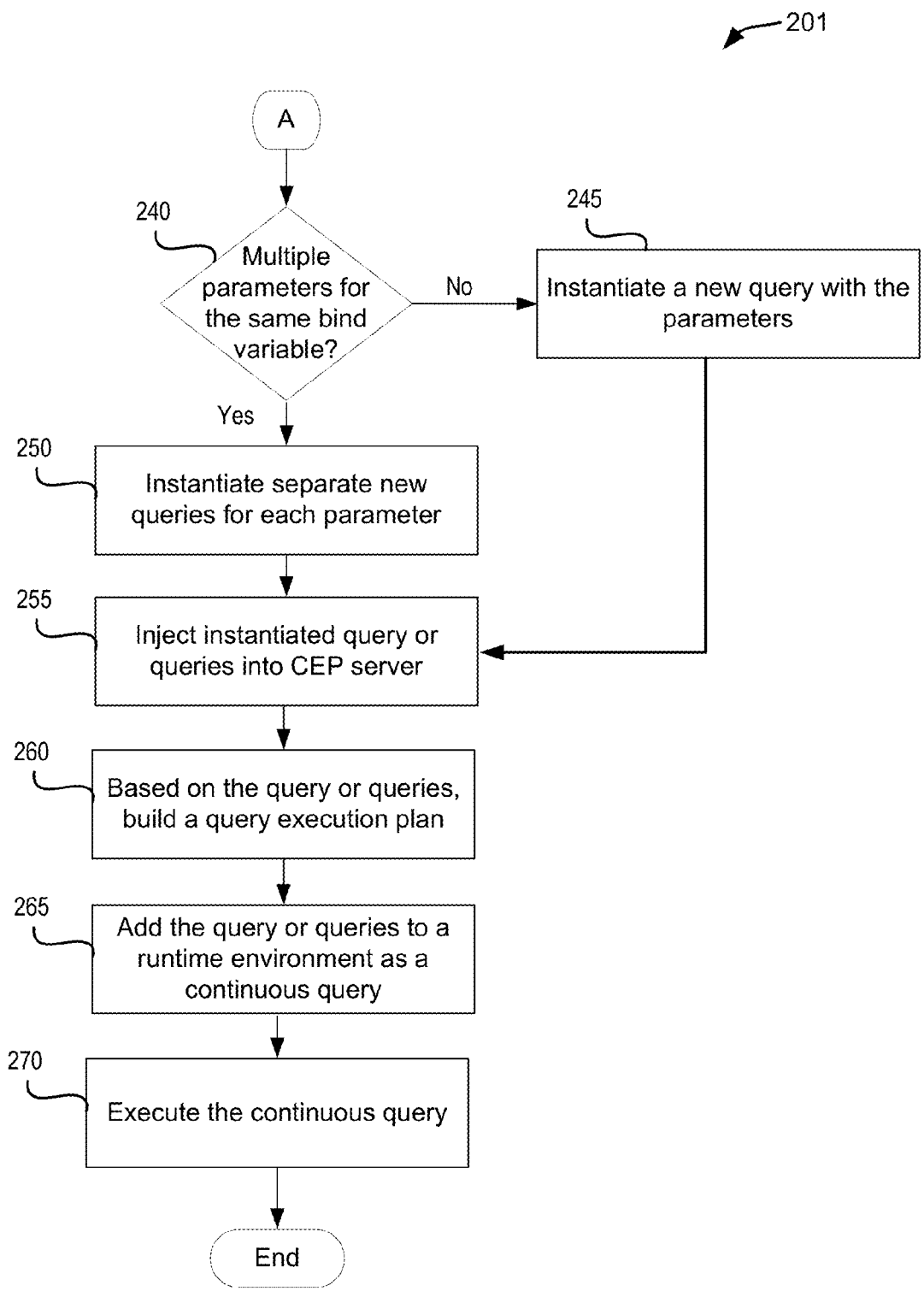

Moving from point 'A' in FIG. 2A to point 'A' in FIG. 2B a method 201 of implementing parameterized queries in CEP is illustrated, according to embodiments of the present invention. At decision block 240, a determination is made whether there are multiple sets of parameters for the same set of bind variables. For example:

```
<rule id="MarketQuery"><![CDATA[
    SELECT symbol, AVG(price) AS average, :1 AS market
        FROM StockTick [RANGE 5 SECONDS]
            WHERE symbol = :2
    ]]></rule>
</rules>
<bindings>
    <binding id="MarketQuery">
        <params id="nasORCLQuery">NASDAQ, ORCL</params>
        <params id="nyJPMQuery">NYSE, JPM</params>
        <params id="nyWFCQuery">NYSE, WFC</params>
```

Here there are three parameter sets. (each in bold)
Here the bind variable set if :1, :2

Furthermore, if it is determined that multiple sets of sets of parameters do not correspond to the same bind variable, then a single new query is generated with the sets of sets of parameters (process block 245). If it is determined that multiple sets of parameters are provided for the same bind variable, then separate new queries are instantiated for each parameter (process block 250).

Accordingly, at process block 255, the instantiated queries are then injected into the CEP server (query sent to the CQL engine). The CQL engine then builds a query execution plan (process block 260) and adds the query to the runtime environment as a continuous query (process block 265). Finally, at process block 270, the instantiated query or queries are executed.

Figure 2C:
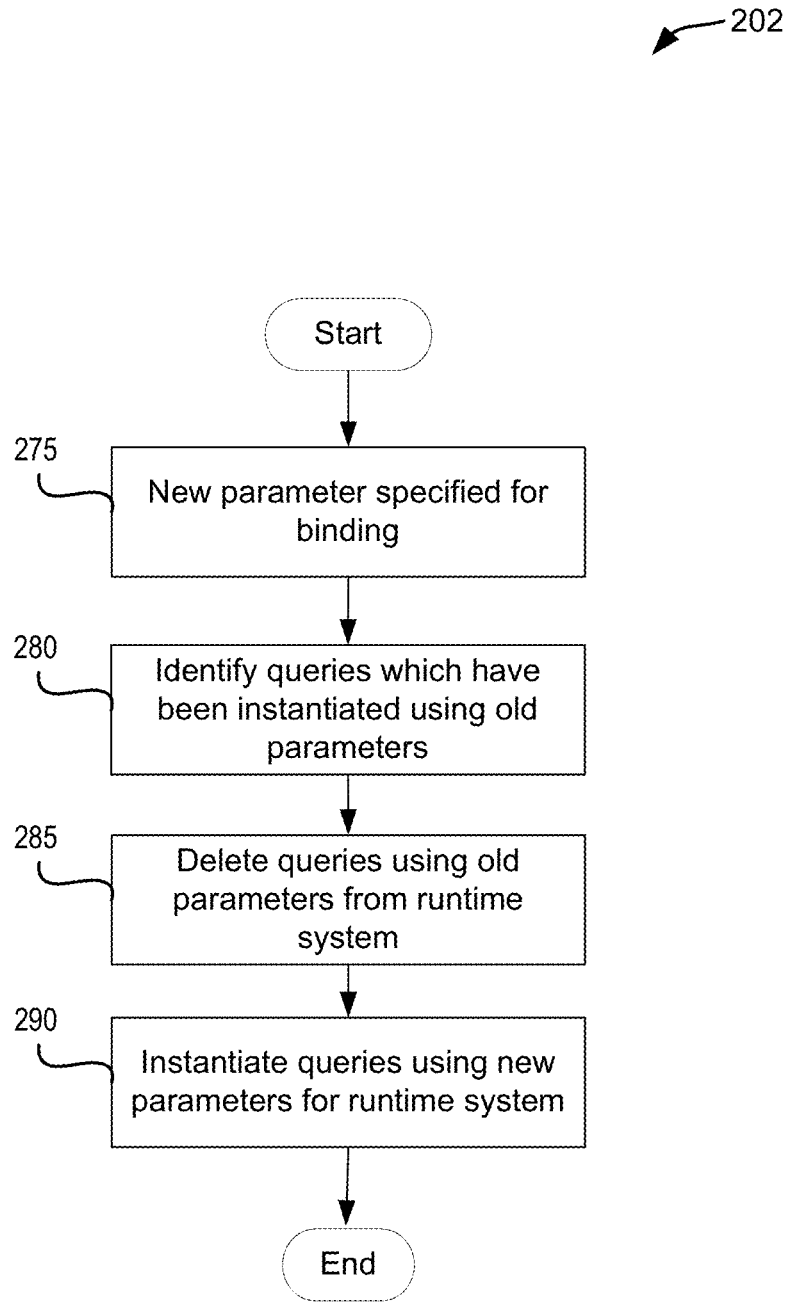

Turning now to FIG. 2C, a method 202 of implementing parameterized queries in CEP is illustrated, according to embodiments of the present invention. At process block 275, a new parameter (instead of an old parameter) may be specified for a bind parameter. In such a situation, queries which have been instantiated with the old parameter are identified (process block 280).

Accordingly, the identified queries using the old parameter are deleted from the runtime environment (process block 285). At process block 290, queries using the new sets of parameters for the runtime system are instantiated. Processing as described above may be done using neighbor sets of parameters. For example, if the bind variables position map has already been created, then there may be no need to repeat the steps up to this—processing can continue where the new sets of parameters are scanned and then the substitution is performed. In essence, the exiting query is replaced with the new instantiated query with the new sets of parameters.

Furthermore, sets of parameters may be tied to a rule that include the query template. In one embodiment, a view definition (done using, for example, CQL) may also use bind variables. Parameterization in the context of continuous queries, "parameterized query" or "query template" includes a query with at least one bind variable.

Figure 3:
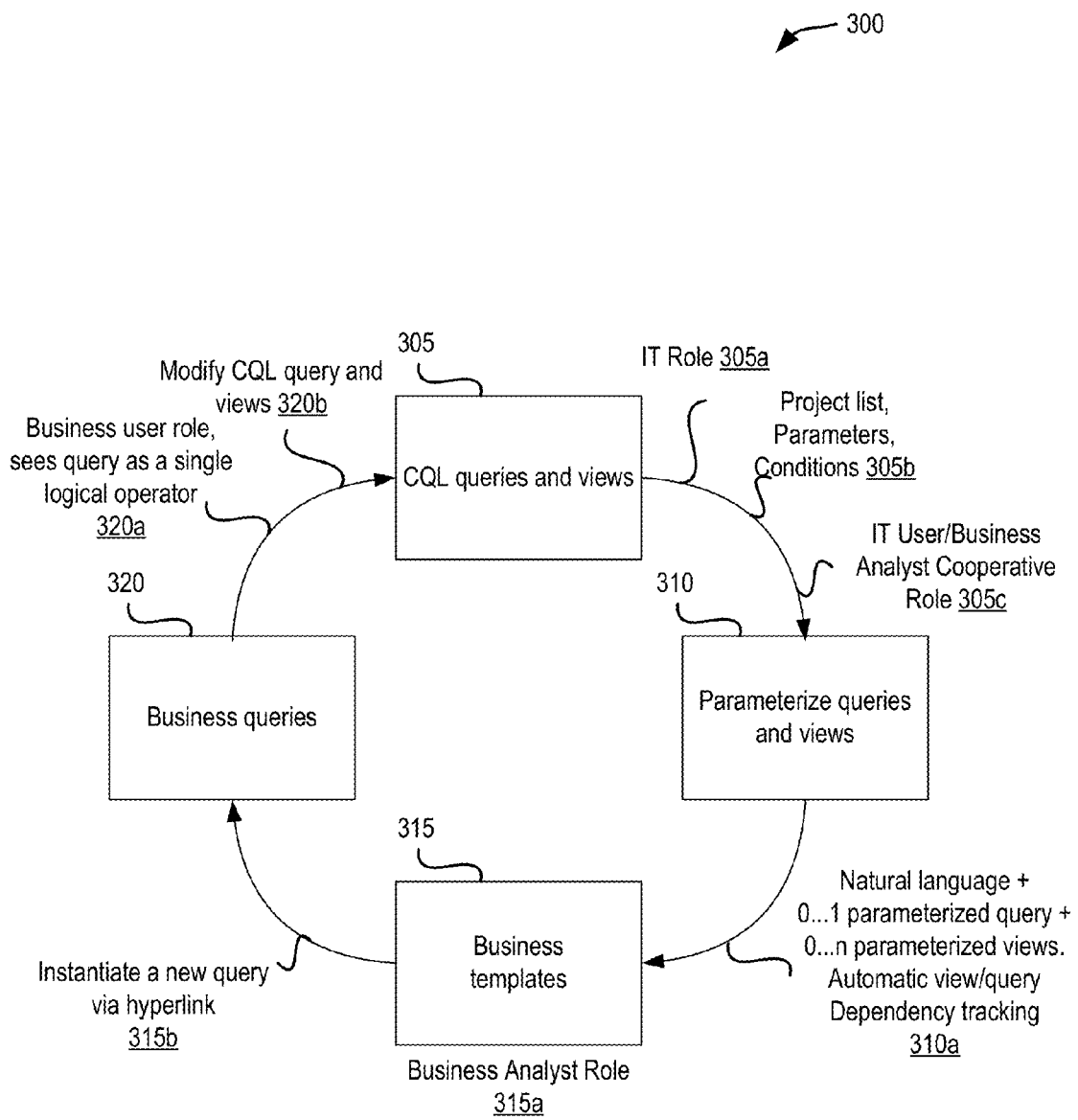
FIG. 3 is a flow diagram for implementing parameterized queries in CEP, according to an embodiment of the present invention.

Turning now to FIG. 3, a method 300 for describing a CQL and business queries life-cycle is illustrated, in accordance with embodiments of the present invention. At block 305a an IT role is created, which includes projects lists, sets of parameters, and conditions 305b. Further, at block 305c, IT user/business users analyst cooperative rules are created.

At block 310, the queries and views are parameterized. For example, natural language+0 ... 1 parameterized query+0 ... n parameterized views, and automatic view/query, dependency tracking 310a may be generated. At block 315, business temples are created for the business analyst role 315a. At block 315b, a new query is instantiated via a hyperlink, or the like.

Accordingly, at block 320 business queries are created. Then, the business user role sees query as a single logical operator 320a, and is able to modify CQL query and views 320b, to return to the CQL queries and views 305.

Figure 4B:
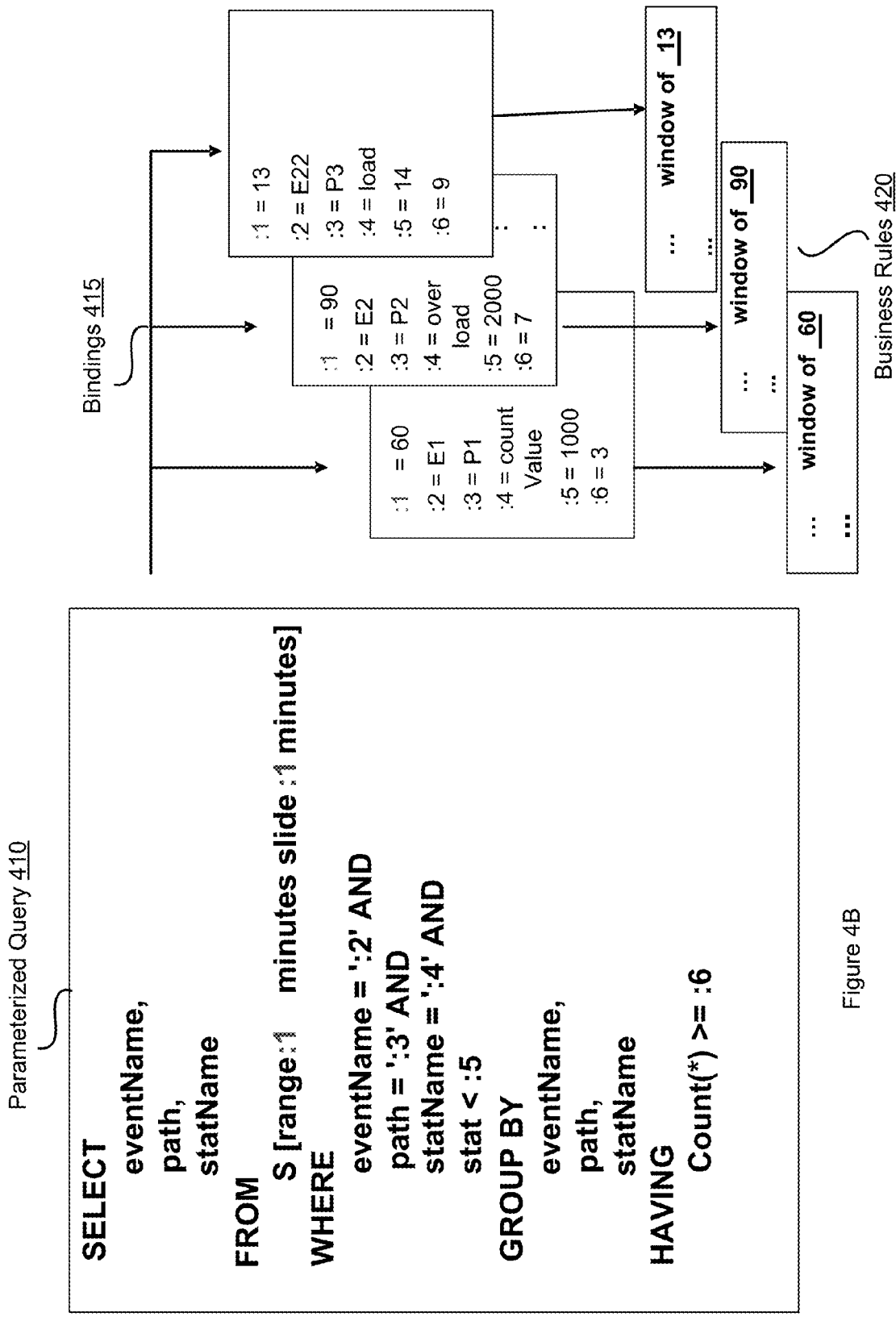

FIG. 4A includes an example query 405 which is permanently bound to hard-coded values. FIG. 4B includes a parameterized query 410, bindings 415, and business rules 420, and FIG. 4C includes templates 425, parameterized views 430, and parameterized queries 435. Furthermore, FIG. 4D includes parameterized view and query 440, a template 445, and a business query 450.

One example which uses the information in FIGS. 4A-4D is as follows:
  Filter1: (eventName=E1, path=P1, statName=countValue)
  Fact1: (countValue of input events having eventName=E1, path=P1)
  Condition1: Fact1<1000
  Trigger1: Condition1 happening 2 or more times in the last 30 minutes
  Another example is as follows:
  Filter1: (eventName=E1, path like '*P1*', statName=count)
  Fact1: (countValue of input events having eventName=E1 and paths like '*P1*')
  Condition1: Fact1<1000
  Trigger1: Condition1 happening 2 or more times in the last 30 minutes on each distinct path.

Accordingly, these queries return the sum of the specified statistic and time at which the sum of the specified statistic is less than 1000, 2 or more times in 30 minutes, for event name E1, path P1, and statistic countValue.

Figure 5A:
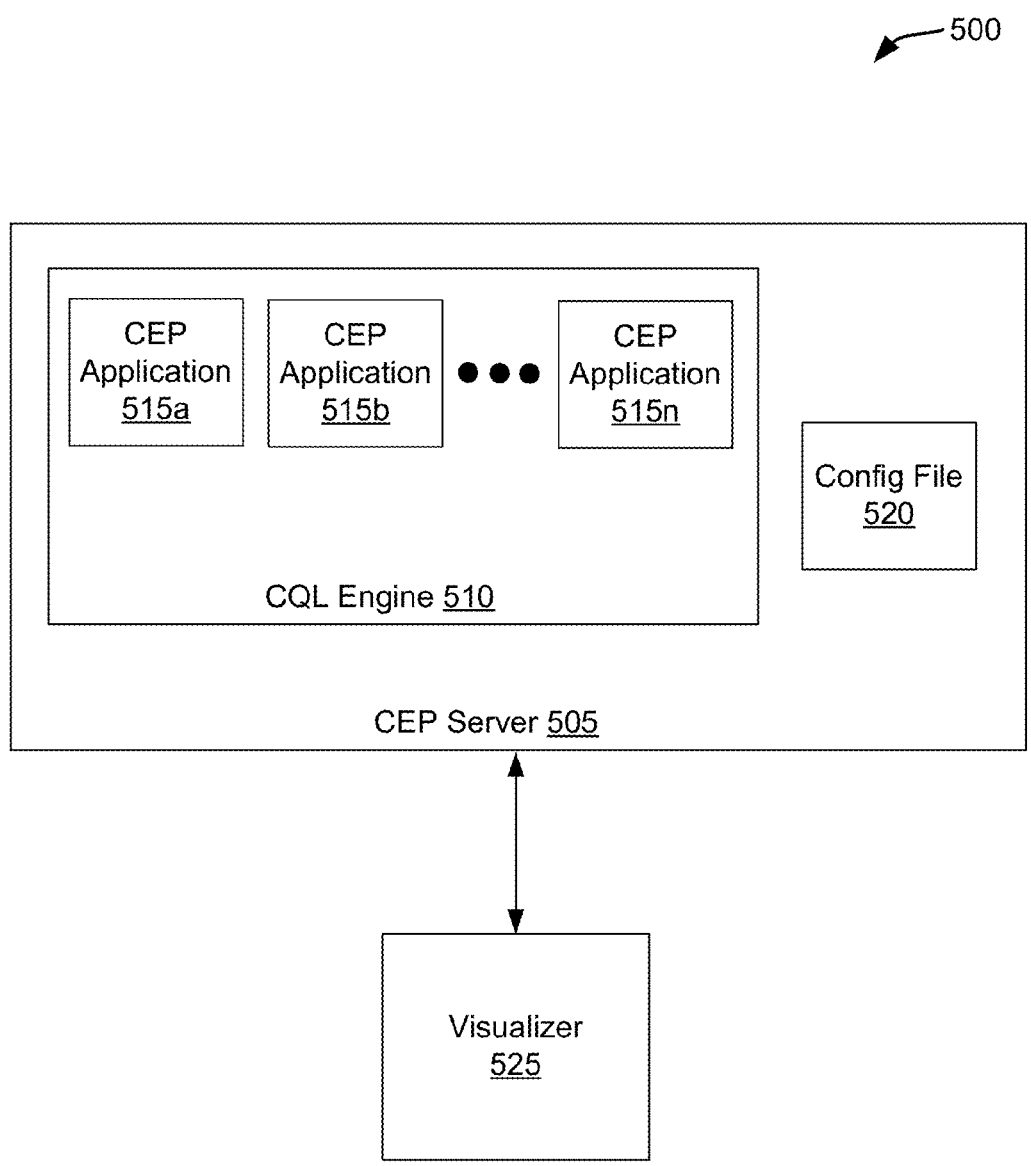
FIGS. 5A and 5B are block diagrams for implementing parameterized queries in CEP, according to an embodiment of the present invention.

Turning now to FIG. 5A, a system 500 for implementing parameterized queries in CEP is illustrated, according to an embodiment of the present invention. In one embodiment, system 500 may include a CEP server 505 which includes a CQL engine 510 and a config file 520. Further, the CEP server 505 is in communication with a visualizer 525.

In one embodiment, the CQL engine 510 executes all of the queries together. The execution plan for a CQL engine 510 includes a set of nodes connected together—all the queries are part of the execution plan and are thus not independent. Thus, CEP string substitution is used to replace the bind variables with the sets of parameters provided for the bind variables, without doing any kind of type checking, etc. This is different from regular databases, where bind variables also have to pass through type checking, etc. As a result, bind variables in the CEP context offer a more flexible and as a result a more powerful solution, and allow the user to insert arbitrary predicates. Accordingly, bind variables in the CEP environment may be typeless.

CQL engine 510 is configured to implement multiple CEP applications 515a, 515b, to 515n. For example, multiple CEP applications can be written, each doing different processing, and they can all be deployed on the same CEP server 505. The CEP server 505 then includes the CQL engine 510 and can have multiple deployed CEP applications (515a, 515b, to 515n).

The visualizer 525 is an interface through which a business user can provide the sets of parameters. Furthermore, the config file 520 is associated with a processor within an application. The config file 520 can be created anytime, at deployment, prior to deployment, or after deployment. Then, when the CEP application (515a, 515b, or 515n) is in the runtime environment, it may have an associated config file 520 that identifies the query template (i.e., the query with the bind variables) and the sets of parameters to be substituted for the bind variables.

Figure 5B:
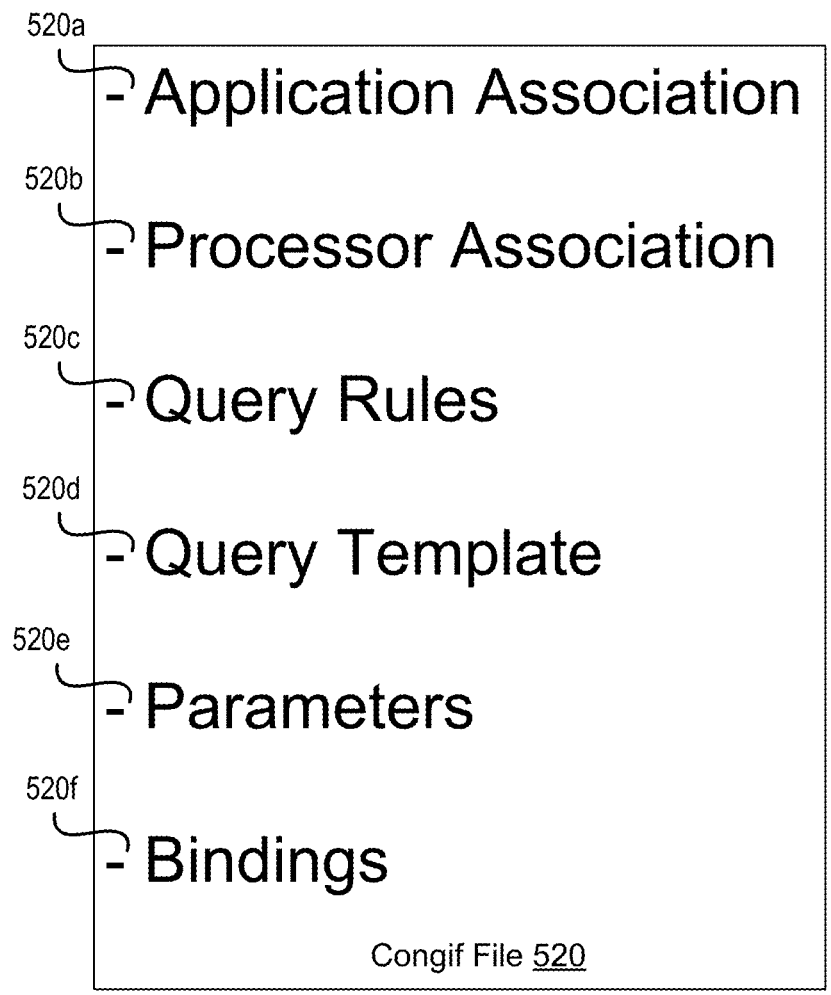

FIG. 5B illustrates one embodiment of a config file 520. The config file 520 may include identification of the application with which the file is associated 520a, identification of the processor 520b, identification of rules 520c, the query template 520d, identification of the sets of parameters 520e, and the bindings 520f. Other embodiments of the config file may be used.

Figure 6:
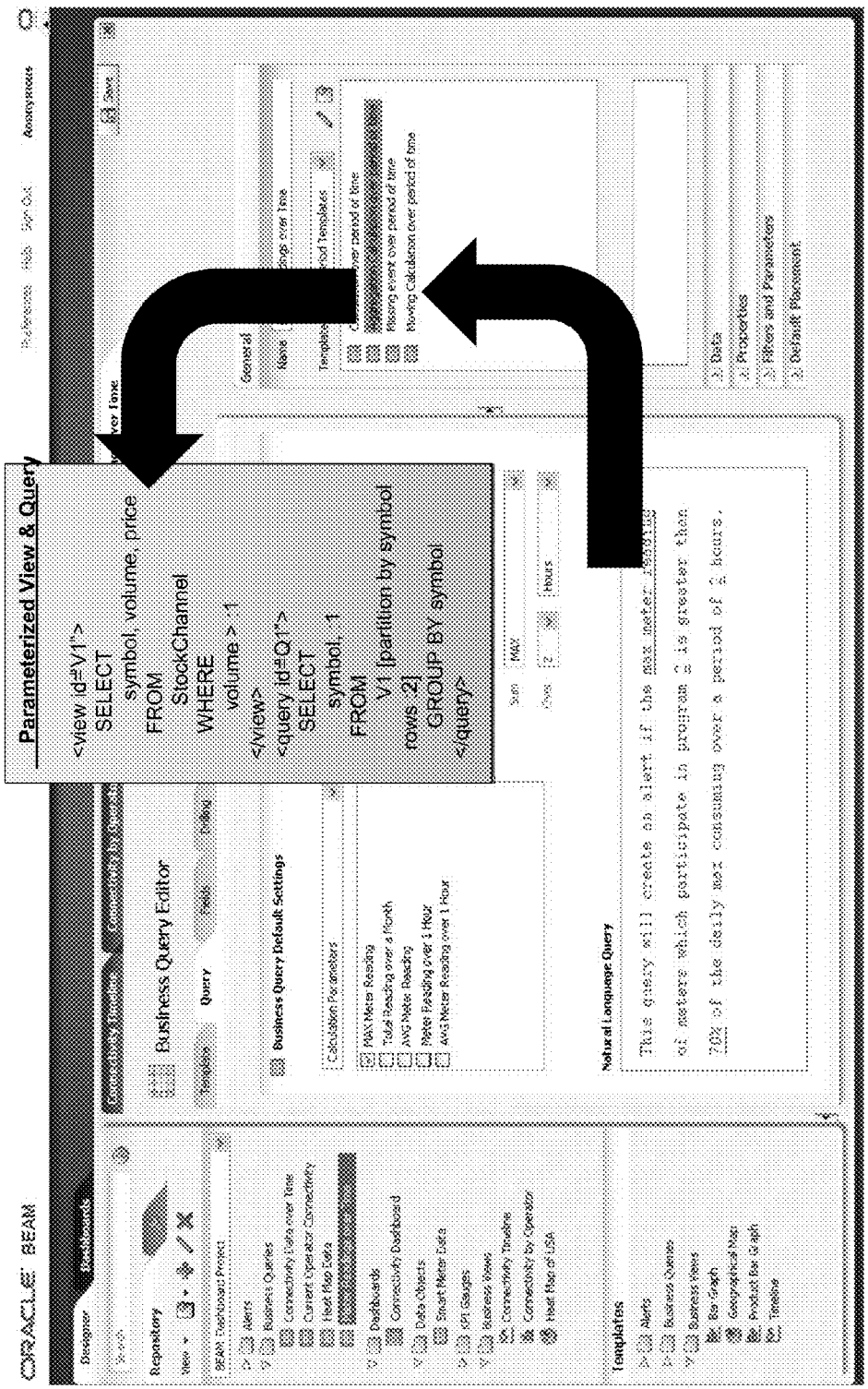
FIG. 6 is a user interface for implementing parameterized queries in CEP, according to an embodiment of the present invention.

Referring next to FIG. 6, an embodiment 600 of a user interface for parameterized queries in CEP is shown. Benefits of such a user interface include helping to remedy the need to provide simplicity of usage. Most business users do not want to write queries. For example, CQL is difficult for non-programmers to understand, so in the CEP case, the query will be designed by someone in the IT dept after understanding the business user's needs, and the query may comprise bind variables. The query is then exposed to the business user in a simple-to-read format (e.g., in an English version of the query that is easy for the business user to understand). The English version may comprise bind sets of parameters (which may be shown via URL links) that bind to actual values at runtime. At runtime, a new query is instantiated with the parameter values provided to be substituted for the bind variables, and the instantiated query is then injected into the CEP system for execution. This offers ease of use to the user. The business users do not have to be concerned with low level CQL.

Figure 7:
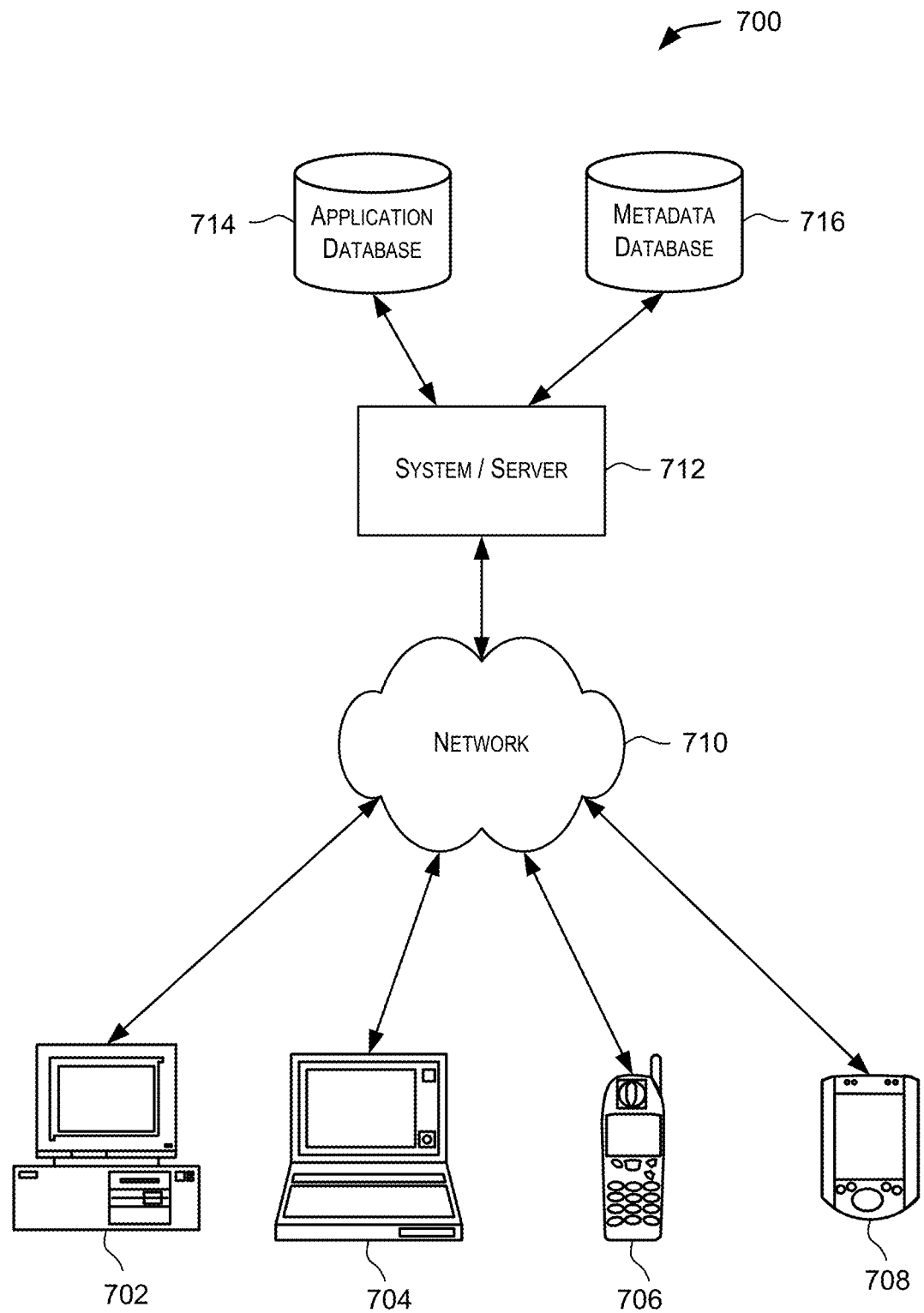
FIG. 7 is a simplified block diagram of a system environment that may be used in accordance with an embodiment of the present invention.

FIG. 7 is a simplified block diagram illustrating components of a system environment 700 that may be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, and 708 may interact with an event processing system 712.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices may be supported. Other devices such as devices with sensors, etc. may interact with system 712.

System environment 700 may include a network 710. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System 712 may comprise one or more server computers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, system 712 may be adapted to run one or more services or software applications described in this application.

System 712 may run an operating system including any of those discussed above, as well as any commercially available server operating system. System 712 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more databases 714 and 716. Databases 714 and 716 may reside in a variety of locations. By way of example, one or more of databases 714 and 716 may reside on a storage medium local to (and/or resident in) system 712. Alternatively, databases 714 and 716 may be remote from system 712, and in communication with system 712 via a network-based or dedicated connection. In one set of embodiments, databases 714 and 716 may reside in a storage-area network (SAN) familiar to those skilled in the art. Similarly, any necessary files for performing the functions attributed to system 712 may be stored locally on system 712 and/or remotely, as appropriate. In one set of embodiments, databases 714 and 716 may include relational databases, such as Oracle 10g and 11g, which are adapted to store, update, and retrieve data in response to SQL-formatted commands.

Figure 8:
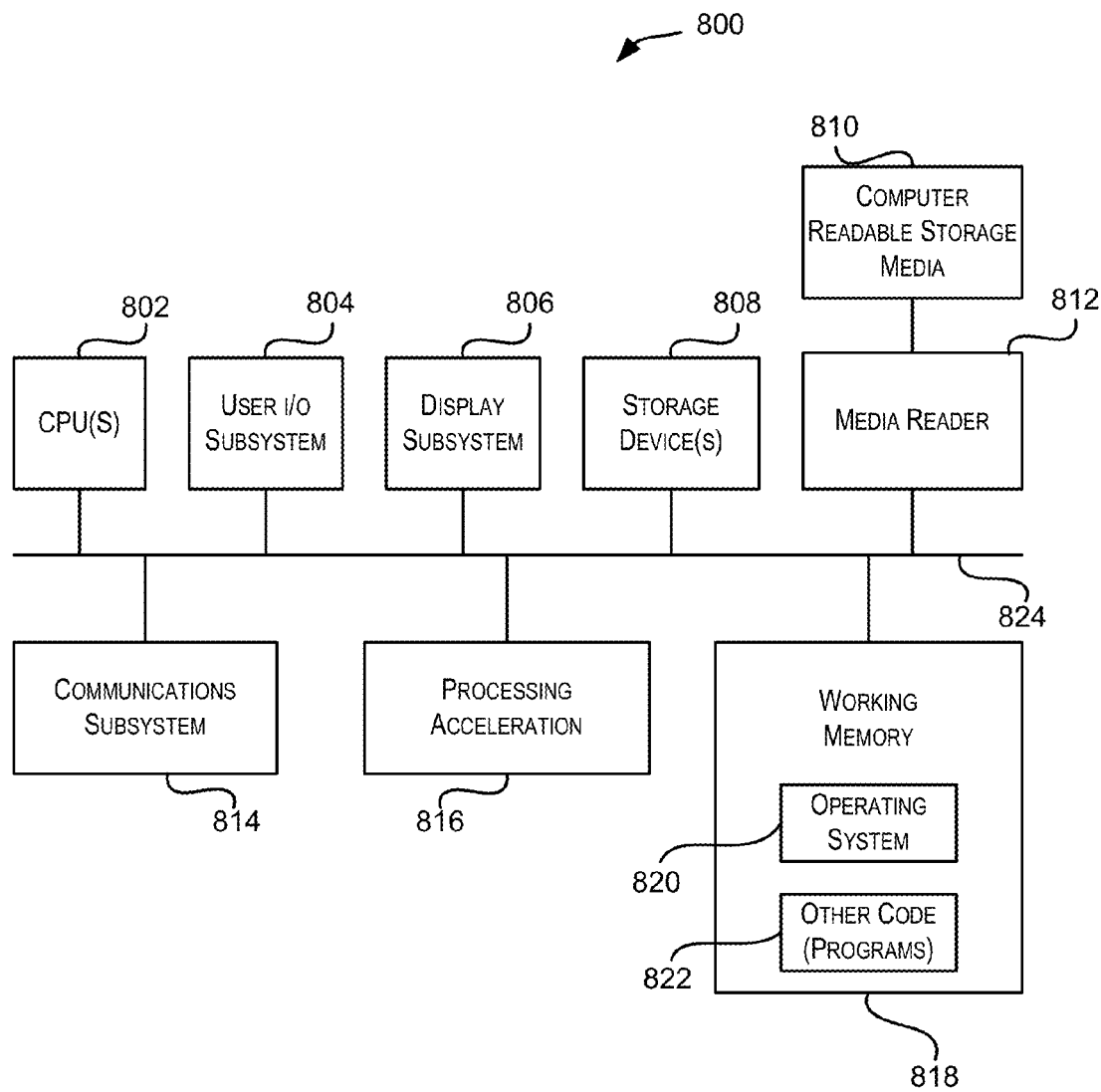
FIG. 8 is a simplified block diagram of a computer system that may be used in accordance with an embodiment of the present invention.

FIG. 8 is a simplified block diagram of a computer system 800 that may be used in accordance with embodiments of the present invention. For example, system 800 may be used to implement event processing server 102 in FIG. 1. Computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, the storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications subsystem 814 may permit data to be exchanged with network 710 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In an exemplary embodiment, working memory 818 may include executable code and associated data structures (such as caches) used for processing events and performing data cartridge-related processing as described above. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of providing parameterized queries in complex event processing (CEP) environment, the method comprising:
   providing a query template which includes one or more bind variables, wherein the one or more bind variables are typeless within the CEP environment;
   providing sets of parameters corresponding to the one or more bind variables;
   parsing the query template to determine positions of the one or more bind variables;
   scanning the provided sets of parameters to determine which of the sets of parameters are to be bound to the one or more bind variables;
   binding the one or more bind variables which are determined to be bound to the corresponding sets of parameters;
   inserting one or more arbitrary predicates into the query template, based on the one or more bind variables being typeless;
   substituting the bound one or more bind variables with the corresponding sets of parameters;
   determining that the sets of parameters correspond to the same bind variable;
   based on the sets of parameters, generating a single parameterized query which is a template that provides possible values for the bound one of more bind variables;
   determining a placeholder occurring in the single parameterized query for processing an event stream;
   substituting the placeholder at runtime with parameter values corresponding to the sets of parameters;
   generating multiple customized queries and views which differ by at least only one variable based on the substituting;
   instantiating a new query for each of the sets of parameters which correspond to the same bind variable as a continuous query; and
   executing the continuous query to process the event stream.

2. The method of providing parameterized queries in CEP as in claim 1, further comprising building a map of the determined positions of the one or more bind variables.

3. The method of providing parameterized queries in CEP as in claim 2, wherein the substituting of the one or more bind variables with the corresponding sets of parameters further comprises using the map of determined positions of the one or more bind variables to place the bound sets of parameters within the query template.

4. The method of providing parameterized queries in CEP as in claim 1, wherein the providing of the sets of parameters corresponding to the one or more bind variables is performed either statically or dynamically.

5. The method of providing parameterized queries in CEP as in claim 4, wherein the providing of the sets of parameters corresponding to the one or more bind variables is performed statically by using a config file at deployment time of the query template.

6. The method of providing parameterized queries in CEP as in claim 4, wherein the providing of the sets of parameters corresponding to the one or more bind variables is performed dynamically by using a module management solution.

7. The method of providing parameterized queries in CEP as in claim 5, wherein the config file includes one or more of the following: application association, processor association, query rules, the query template, the sets of parameters, or the bindings.

8. A system for providing parameterized queries in complex event processing (CEP), the system comprising:
   a memory; and
   a processor coupled with the memory, wherein the memory has sets of instructions stored thereon which, when executed by the processor, cause the processor to:
   provide a query template which includes one or more bind variables, wherein the one or more bind variables are typeless within the CEP environment;
   provide sets of parameters corresponding to the one or more bind variables;

parse the query template to determine positions of the one or more bind variables;
scan the provided sets of parameters to determine which of the sets of parameters are to be bound to the one or more bind variables;
bind the one or more bind variables which are determined to be bound to the corresponding sets of parameters;
insert one or more arbitrary predicates into the query template, based on the one or more bind variables being typeless;
substitute the bound one or more bind variables with the corresponding sets of parameters;
determine that the sets of parameters correspond to the same bind variable;
based on the sets of parameters, generate a single parameterized query which is a template that provides possible values for the bound one of more bind variables;
determine a placeholder occurring in the single parameterized query for processing an event stream;
substitute the placeholder at runtime with parameter values corresponding to the sets of parameters;
generate multiple customized queries and views which differ by at least only one variable based on the substituting;
instantiate a new query for each of the sets of parameters which correspond to the same bind variable as a continuous query; and
execute the continuous query to process the event stream.

9. The system for providing parameterized queries in CEP as in claim 8, wherein the sets of instructions when further executed by the processor, cause the processor to:
generate the query; and
process the event stream.

10. The system for providing parameterized queries in CEP as in claim 9, further comprising:
a CEP server including a Continuous Query Language ("CQL") engine, wherein the CQL engine instantiates a plurality of CEP applications; and
a visualizer in communication with the CEP server, wherein the visualizer is configured to display result information from the processed event stream.

11. A non-transitory computer-readable medium having sets of instructions stored for providing parameterized queries in complex event processing (CEP), when executed by a computer, cause the computer to:
provide a query template which includes one or more bind variables;
provide sets of parameters corresponding to the one or more bind variables, wherein the one or more bind variables are typeless within the CEP environment;
parse the query template to determine positions of the one or more bind variables;
bind the one or more bind variables which are determined to be bound to the corresponding sets of parameters;
insert one or more arbitrary predicates into the query template, based on the one or more bind variables being typeless;
substitute the bound one or more bind variables with the corresponding sets of parameters;
determine that the sets of parameters correspond to the same bind variable;
based on the sets of parameters, generate a single parameterized query which is a template that provides possible values for the bound one of more bind variables;
determine a placeholder occurring in the single parameterized query for processing an event stream;
substitute the placeholder at runtime with parameter values corresponding to the sets of parameters;
generate multiple customized queries and views which differ by at least only one variable based on the substituting;
instantiate a new query for each of the sets of parameters which correspond to the same bind variable as a continuous query; and
execute the continuous query to process the event stream.

12. The non-transitory computer-readable medium of claim 11, wherein the sets of instructions when further executed by the computer, cause the computer to determine that new sets of parameters are specified for binding.

13. The non-transitory computer-readable medium of claim 12, wherein the sets of instructions when further executed by the computer, cause the computer to:
identify queries which have been instantiated using sets of parameters prior to being specified with new sets of parameters; and
delete the queries which have been instantiated using sets of parameters prior to being specified with new sets of parameters.

14. The non-transitory computer-readable medium of claim 13, wherein the sets of instructions when further executed by the computer, cause the computer to instantiate queries using the new sets of parameters for the runtime system.

15. The non-transitory computer-readable medium of claim 11, wherein the sets of instructions when further executed by the computer, cause the computer to:
convert the sets of parameters into strings;
check the strings of the sets of parameters to determine a form of the sets of parameters;
compare the determined form of the sets of parameters with a form of the corresponding bind variables; and
in response to the determined type of the sets of parameters matching the type of the corresponding bind variables, verify the sets of parameters.

16. The non-transitory computer-readable medium of claim 15, wherein the type of the corresponding bind variables and sets of parameters includes one or more of the following: INT, FLOAT, LONG, BIGDECIMAL, DOUBLE, and STRING.

17. The non-transitory computer-readable medium of claim 11, wherein the sets of instructions when further executed by the computer, cause the computer to scan the provided sets of parameters to determine which of the sets of parameters are to be bound to the one or more bind variables.

18. The non-transitory computer-readable medium of claim 11, wherein the sets of instructions when further executed by the computer, cause the computer to instantiate a new query based on the query temple which includes the corresponding sets of parameters substituted for the one or more bind variables and injecting the new query into a CEP server.

19. The non-transitory computer-readable medium of claim 18, wherein the sets of instructions when further executed by the computer, cause the computer to, based on the new query, build a query execution plan; adding the query execution plan to a runtime environment as a continuous query.

* * * * *

UNITED STATES PATENT AND TRADEMARK OFFICE
CERTIFICATE OF CORRECTION

| | | |
|---|---|---|
| PATENT NO. | : 9,110,945 B2 | Page 1 of 1 |
| APPLICATION NO. | : 14/077230 | |
| DATED | : August 18, 2015 | |
| INVENTOR(S) | : Jain et al. | |

It is certified that error appears in the above-identified patent and that said Letters Patent is hereby corrected as shown below:

Title page

On page 8, column 1, under other publications, line 63, delete "PostgresSQL," and insert -- PostgreSQL, --, therefor.

On page 8, column 1, under other publications, line 63, delete "PostgresSQL" and insert -- PostgreSQL --, therefor.

On page 9, column 2, under other publications, line 37, delete "Integrationand" and insert -- Integration and --, therefor.

Specification

In column 3, line 17, delete "embodiment." and insert -- embodiment, --, therefor.

In column 5, line 7, delete "MaketQuery_" and insert -- MarketQuery_ --, therefor.

In column 7, line 21, delete "matching" and insert -- matching. --, therefor.

Claims

In column 14, line 18, in claim 1, delete "one of more" and insert -- one or more --, therefor.

In column 15, line 17, in claim 8, delete "one of more" and insert -- one or more --, therefor.

In column 15, line 64, in claim 11, delete "one of more" and insert -- one or more --, therefor.

In column 16, line 54, in claim 18, delete "query temple" and insert -- query template --, therefor.

Signed and Sealed this
Twenty-eighth Day of June, 2016

Michelle K. Lee
*Director of the United States Patent and Trademark Office*